US007176832B2

(12) United States Patent
Bruno et al.

(10) Patent No.: US 7,176,832 B2
(45) Date of Patent: Feb. 13, 2007

(54) SAFETY SYSTEM AT SEA FOR ACCURATELY LOCATING A SHIPWRECKED NAVIGATOR

(76) Inventors: Marcel Bruno, Hameau de la Tourre, B.P. 47, Grimaud (FR) F-83310; Patrick Pilard, 31, Boulevard de la Paix, Bloc B, Sainte Maxime (FR) F-83120; Patrick Potiron, 2, Impasse Clair Matin, Jard sur Mer (FR) F-85520; Jean-Claude Valentino, 548, Rue de la Caserne, Talmont Saint Hilaire (FR) F-85440

( * ) Notice: Subject to any disclaimer, the term of this patent is extended or adjusted under 35 U.S.C. 154(b) by 0 days.

(21) Appl. No.: 10/488,167

(22) PCT Filed: Aug. 30, 2002

(86) PCT No.: PCT/IB02/03873

§ 371 (c)(1),
(2), (4) Date: Oct. 20, 2004

(87) PCT Pub. No.: WO03/018398

PCT Pub. Date: Mar. 6, 2003

(65) Prior Publication Data
US 2005/0040987 A1 Feb. 24, 2005

(30) Foreign Application Priority Data
Aug. 30, 2001 (FR) ................................. 01 11768

(51) Int. Cl.
*G01S 1/00* (2006.01)

(52) U.S. Cl. ........................... 342/357.06; 342/357.01; 342/357.08
(58) Field of Classification Search ........... 342/357.01, 342/357.06, 357.07, 417, 419, 357.08; 701/207, 701/213, 215
See application file for complete search history.

(56) References Cited

U.S. PATENT DOCUMENTS 5,006,831 A * 4/1991 de Solminihac ......... 340/573.1

(Continued)

FOREIGN PATENT DOCUMENTS

DE            41 24 831            1/1993

(Continued)

OTHER PUBLICATIONS

Patent Abstracts of Japan vol. 1999, No. 4, Apr. 30, 1999 & JP 11 011396 A (Hitachi Zosen Corp), Jan. 19, 1999 abstract.

*Primary Examiner*—Dao Phan
(74) *Attorney, Agent, or Firm*—Young & Thompson

(57) ABSTRACT

The invention concerns a safety system on board a ship for facilitating rescue of a person having fallen overboard whereby each navigator on board is equipped with an individual portable radio transmitter apparatus and regular links are established between each apparatus and a centralized monitoring radio device, that is a device for receiving radio signals from each individual portable apparatus (even querying them one by one by radio transmission) and in spotting the absence of any apparatus which would indicate the loss of a navigator overboard, by monitoring the regular reception of radio signals emitted by each apparatus and by detecting any absence of reception from the portable apparatus of a navigator to launch in that case a rescue operation.

28 Claims, 21 Drawing Sheets

U.S. PATENT DOCUMENTS

| | | | |
|---|---|---|---|
| 5,408,238 A * | 4/1995 | Smith | 342/357.09 |
| 5,886,635 A | 3/1999 | Landa et al. | |
| 6,150,928 A | 11/2000 | Murray | |
| 6,222,484 B1 | 4/2001 | Seiple et al. | |

FOREIGN PATENT DOCUMENTS

| | | |
|---|---|---|
| DE | 296 18 254 | 5/1997 |
| DE | 196 38 017 | 3/1998 |
| FR | 2 062 221 | 6/1971 |
| FR | 2 637 713 | 4/1990 |
| FR | 2 695 904 | 3/1994 |

* cited by examiner

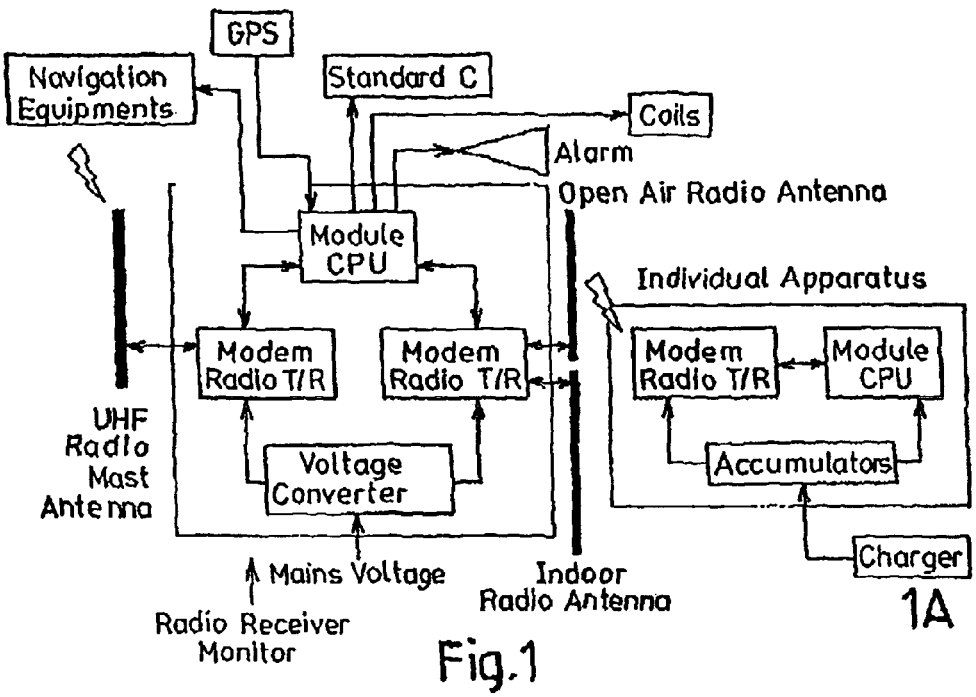
Fig.1
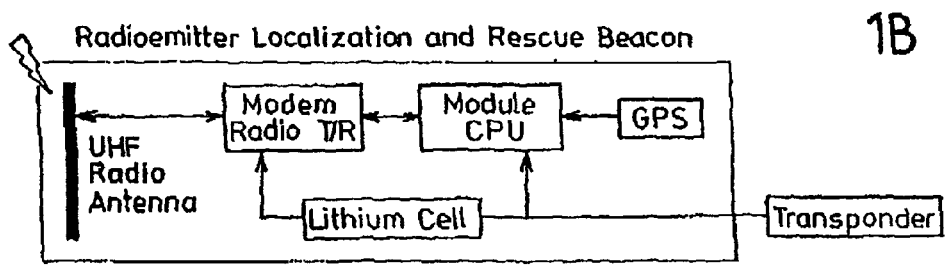
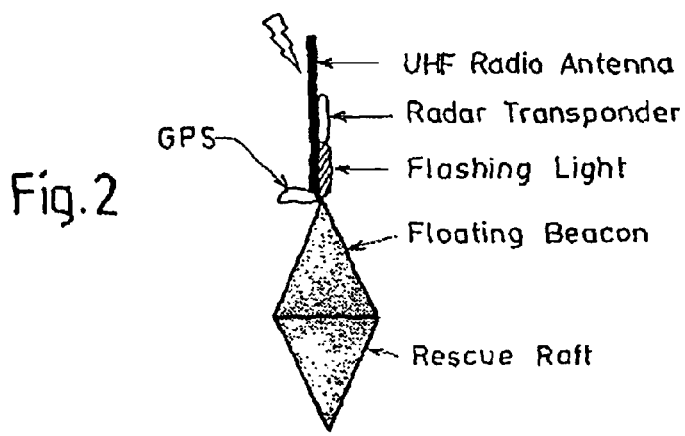
Fig.2

Fig. 6 (Monitor)

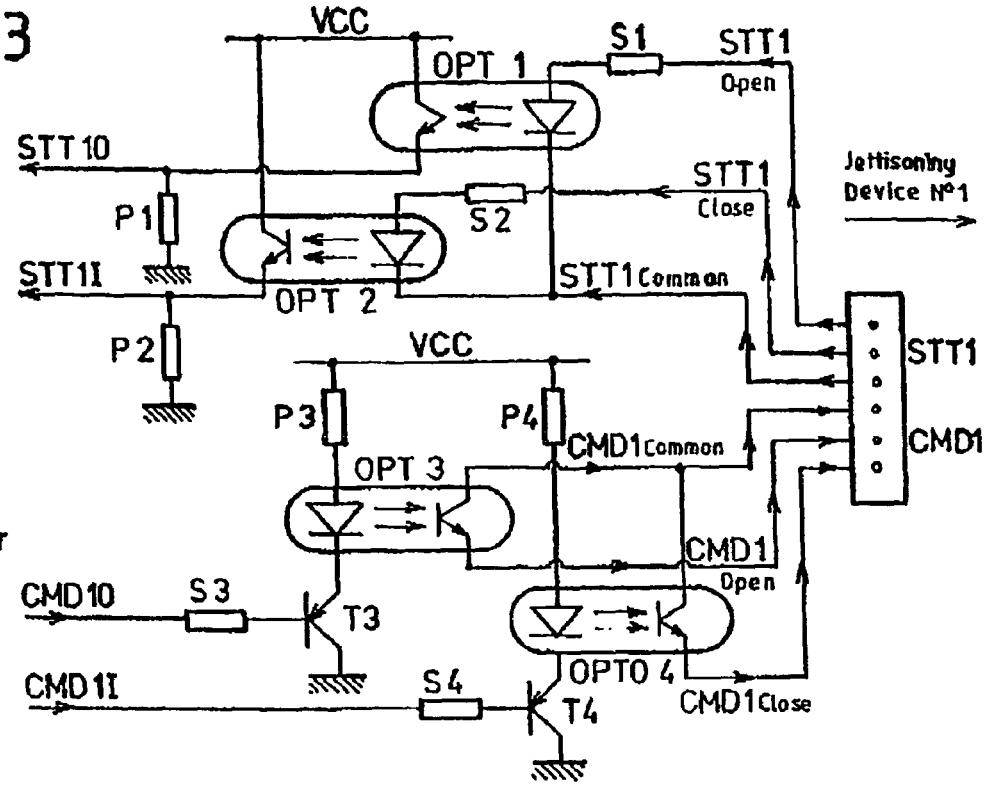
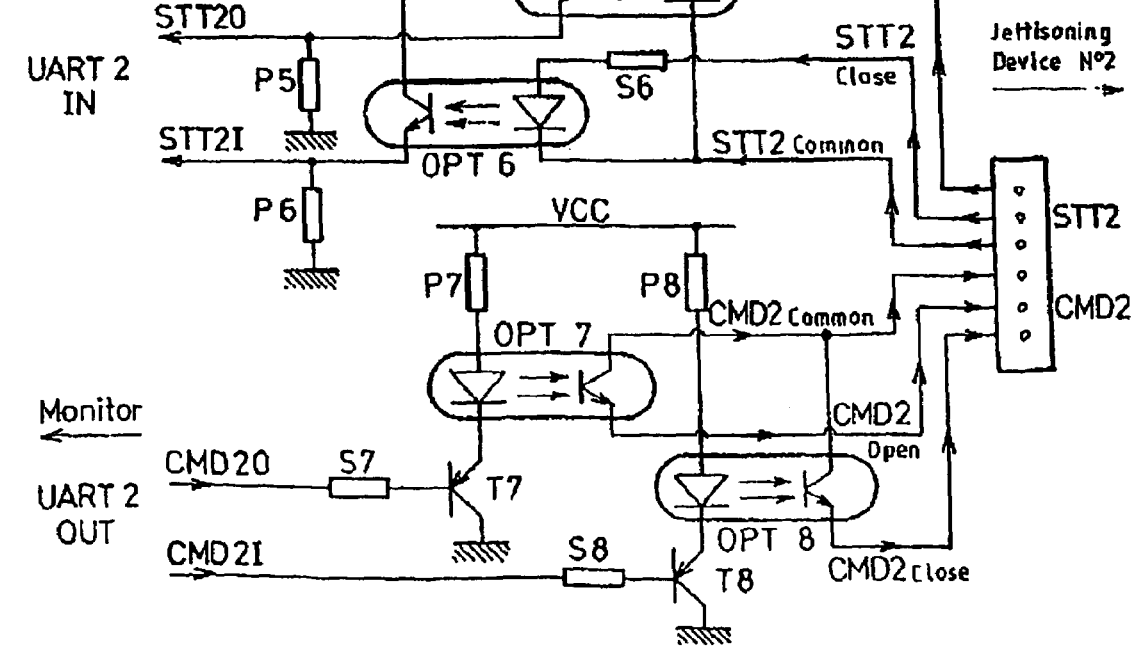

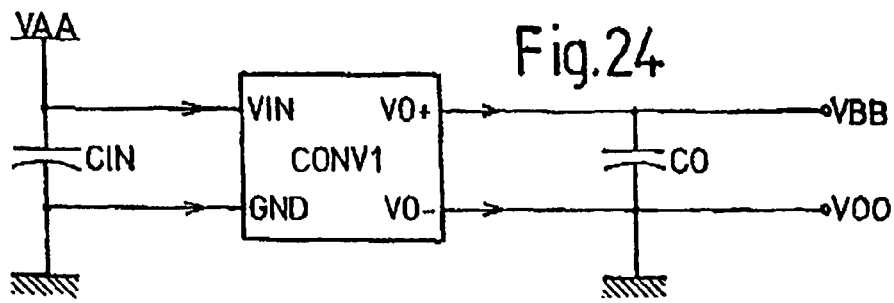
Fig.24
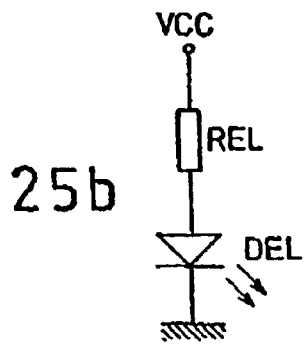
25b
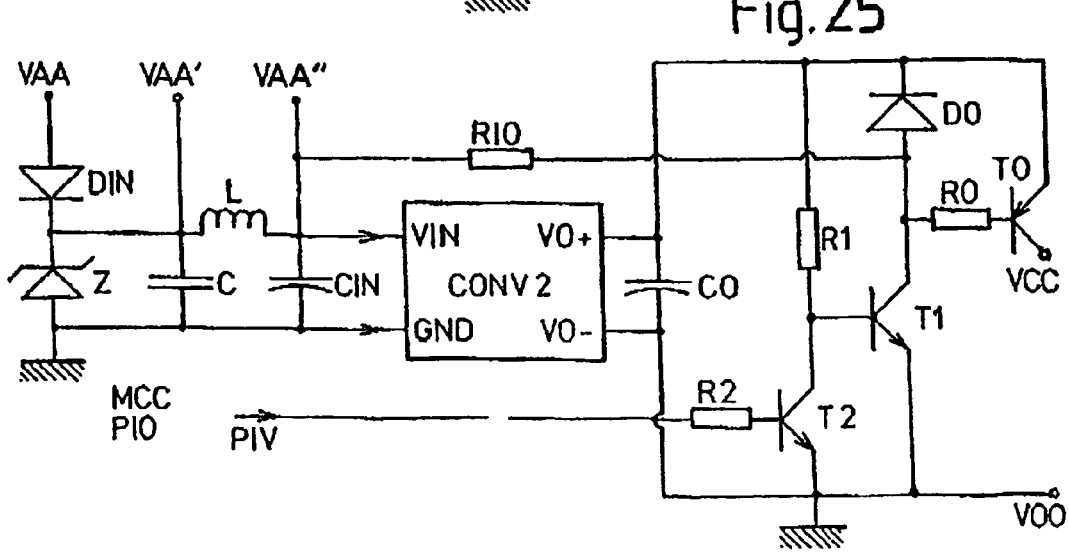
Fig.25
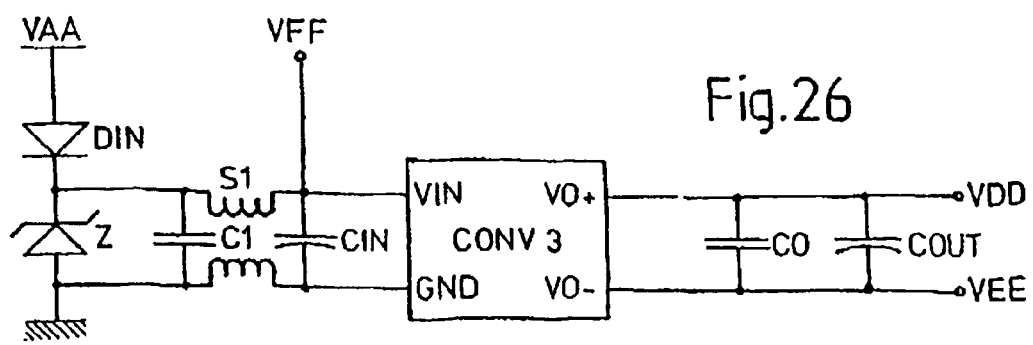
Fig.26

Fig. 27 (Charger)

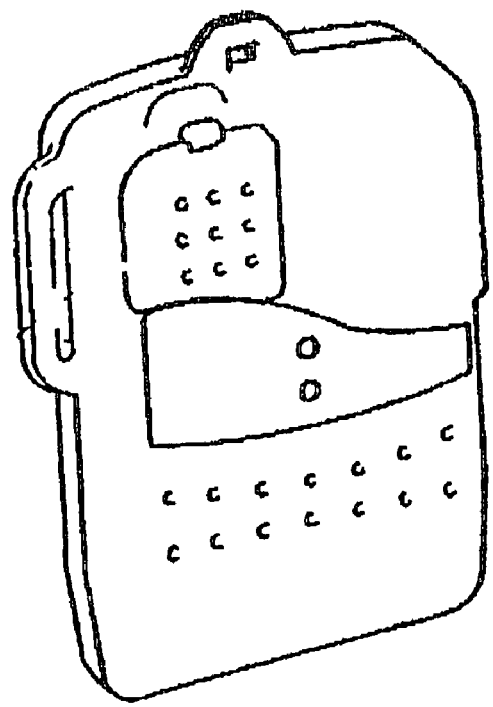
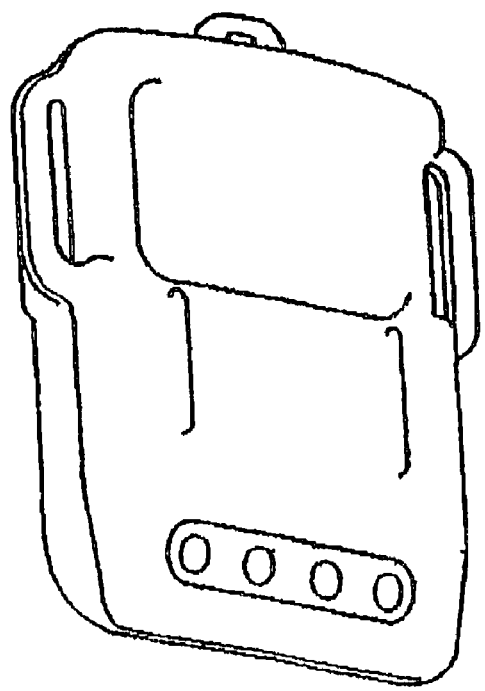
Fig. 33

34a
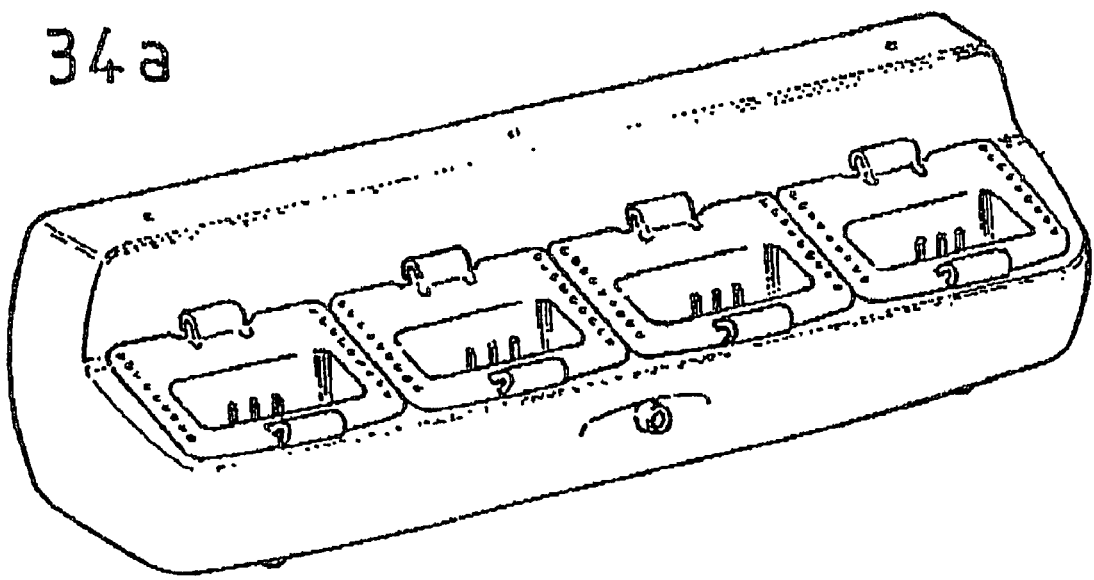
Fig. 34
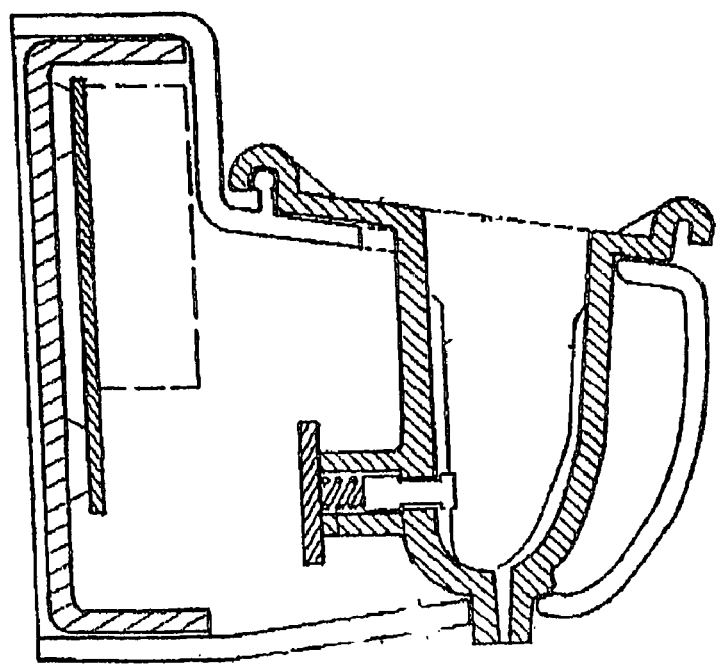
34b

SAFETY SYSTEM AT SEA FOR ACCURATELY LOCATING A SHIPWRECKED NAVIGATOR

BACKGROUND

1. Technical Field

The present invention pertains to the area of safety systems for ship crews to locate persons who have fallen overboard or are lost at sea, to alert emergency networks and to facilitate rescue. More particularly the invention concerns a method and device for alert and distress location, and a distress locating beacon.

2. Prior Art

In the area of sea safety, a device is known through international application WO-98/38083 in the name of the applicant, for modifying a vessel's bearing. This device comprises a radio transmitter worn by a yachtsman and a radio receiver able to act upon the compass of an automatic pilot via a command circuit. The command circuit is able to deviate the magnetic compass needle towards a fictitious North via inductive coils arranged around the compass.

This device is set in operation during a sea race when the automatic pilot is in action, and the yachtsman is intended to wear the transmitter permanently. The receiver permanently captures the radio signal generated by the transmitter since the yachtsman is on board the boat. Should the yachtsman fall overboard, the radio link between the immersed transmitter and the onboard receiver is cut off. The receiver detects the absence of a signal and acts on the command circuit to deviate the magnetic compass needle towards a fictitious North. The automatic pilot then seeks to correct its route setting and acts on the boat rudders to change course. The boat then starts turning indefinitely in circles around the point where the person fell overboard.

This device for correcting a vessel's course is especially indicated for single-handed boat races. It is particularly suitable for light sailing vessels.

For racing sailing vessels however, at speeds as high as 40 knots (75 km/h) or 50 knots (53 km/h) the speeds currently being reached, a sudden change of course is prohibited. However use of the device for changing a vessels' course has heightened the need for a safety device for yachtsmen taking part in single-handed races.

Further to a series of recent accidents at sea both on single-handed and crewed racing vessels as well as on fishing vessels, the demand for a suitable safety device has become mandatory.

For fishing vessels, commercial vessels and heavy surface craft, the inertia is too high for a sudden change in course to be made and take up circular movement around a point where a person has been lost at sea.

The subject of the present invention is therefore the development of a new safety device for vessel crews intended to facilitate the rescue of overboard persons.

One objective of the invention is to enable the accurate locating of any overboard person.

A further subject of the invention is the automatic transmission of a distress signal to be captured and retransmitted by rescue networks so as to alert other nearby vessels, rescue centres and even aircraft within the area.

BRIEF DESCRIPTION OF THE INVENTION

Briefly, the invention makes provision for a safety system on board vessels intended to facilitate the rescue of a person fallen overboard, by equipping each crew member on board with an individual, portable radio-transmitter unit and by setting up regular radio links between each transmitter unit and a centralised radio monitoring device, i.e. a device able to receive radio signals from each individual portable transmitter (even to poll them in turn by radio transmission) and to scan the absence of any transmitter which would indicate the loss at sea of a crew member, through the regular monitoring of radio signals transmitted by each transmitter unit and the detection of any lack of reception from a crew member's portable transmitter and to trigger distress procedure in this case.

In surprising manner, the distress procedure of the invention provides for the immediate, automatic recording of the exact distress position using onboard GPS equipment, so that other crew members are able to divert the vessel immediately to the exact distress position and recover their crew member lost overboard. The invention also provides for the immediate, automatic jettisoning of a floating beacon, itself equipped with GPS equipment and radio transmission means to send back to the ship, even to other vessels equipped with the same system, the corrected positioning of the overboard person, which is especially useful under strong current and drifting conditions.

Advantageously the beacon is fitted with a flashing light and complete survival means (life raft, survival kit, portable VHF) so that the overboard person is able to reach the beacon for initial self-rescue until the arrival of recovery teams. Advantageously the beacon is also equipped with a radar transponder to facilitate its location by all vessels and by all rescue means.

Provision is also made in the invention's distress procedure, in the event of detected absence of a portable transmitter, for the automatic triggering of a distress alert broadcast under the Global Maritime Distress and Safety System (GMDSS) via the GMDSS distress alert radio station which is compulsory on all ocean-going vessels.

The GMDSS distress alert may be broadcast by Digital Selective Calling which alerts coast stations and all vessels within the area, which automatically record and retransmit the Distress Alert so as to send rescue.

The jettisoning of the beacon and automatic triggering of a distress alert are of particular importance in the event of a single-handed yachtsman falling overboard or should a whole vessel capsize with all its crew.

These three fundamental actions are complementary to one another, but independent, and may be operated either alone or jointly as will be seen below.

The invention is obtained by implementing a method for safety on board vessels with which to detect one or more overboard persons, to give an immediate alert and to locate accurately the point of the distress incident, so as to send help immediately and to allow rapid rescue of the overboard person or persons, the method using the steps consisting of:

equipping each crew member or at least some of the crew members with a respective, individual, portable radio transmitter unit, each transmitter regularly transmitting an identification radio signal, permanently scanning, by means of a radio monitoring device, the reception and identification of radio signals regularly transmitted by each individual portable transmitter, automatically detecting any lack of reception of regular radio signal transmission from at least one individual portable transmitter, and in this case:

automatically recording precise overboard positioning data given by the onboard satellite network Global Positioning System (GPS), the precise positioning data being memorised as soon as no regular radio signal is received from an individual portable radio transmitter, and displaying the automatically recorded precise positioning data so that another crew member can reroute the vessel and promptly direct it to the precise location of the distress incident.

Preferably, an alarm is automatically triggered on board the vessel.

The invention is preferably achieved by means of a radiomonitoring device intended to scan the presence of one or more individual portable radio transmitters, forming a safety system on board a vessel with which it is possible to detect one or more overboard persons, to give an immediate alert and to identify the overboard location accurately so as to send rescue immediately enabling rapid recovery of the overboard person or persons, the device being characterized in that it comprises:

means for receiving identification radio signals regularly transmitted by each individual portable transmitter unit, means for permanently scanning the regular reception and identification of radio signals transmitted by each individual portable transmitter, means for automatically detecting any lack of reception of a radio signal from at least one individual portable transmitter, means for automatically recording precise distress positioning data given by a GPS satellite system, the precise data on overboard positioning (MOB) being recorded substantially as soon as the absence is detected of regular radio transmission by at least one individual portable transmitter.

If no signal reception is detected from a portable transmitter, provision is made for the following steps:

continuously scanning, by means of the radiomonitoring device, the reception and identification of radio signals regularly transmitted by each of the other individual portable transmitters, automatically detecting any other lack of reception of regular radio signal transmission by at least one other individual portable transmitter, and in this case:

also automatically recording other precise vessel positioning data given by the onboard satellite Global Positioning System as soon as the absence is detected of reception from another individual portable transmitter, re-triggering if necessary the onboard alarm, and displaying alternately or by command each of the automatically recorded precise positioning data items.

should the absence of at least one individual portable transmitter be detected, the steps are provided of:

also automatically recording by means of the radiomonitoring device, the identification of each individual portable transmitter for which no reception is detected, and displaying each recorded identification, alternately or on command.

In the event that no reception is received from at least one individual portable transmitter unit, the steps are provided of:

also automatically recording, by means of the radiomonitoring device, the time or time lapse since the absence was detected of radio signal reception from each individual portable transmitter, and displaying the recorded time or time lapse alternately or on command.

Advantageously, with the radiomonitoring device it is possible to detect immediately the absence of reception from an individual portable transmitter unit, to immediately record precise positioning data given by the onboard Global Positioning System, and to trigger an alarm within a time interval of less than five seconds.

A complementary step is provided in the event of the detected absence of reception from an individual portable transmitter, consisting of:

automatically jettisoning at least one locator and survival radio beacon (BLS) as soon as the absence is detected of regular radio signal reception from at least one individual portable transmitter, the beacon comprising a floating body, GPS position computing equipment and a radio transmitting device able to transmit radio messages containing precise positioning data given by the GPS equipment.

An additional step is provided consisting of:

also jettisoning a floating rescue container connected to the locator and survival radio beacon, the floating container possibly containing a life raft, survival kit, VHF transceiver and/or a satellite telephone.

Provision is made for equipping the beacon with a radar transponder and an additional step consisting of:

remote searching and locating of the beacon using a radar screening device,

Complementary steps are provided of:

receiving, by radio receiver means, radio messages transmitted by the beacon device (BLS), and successively recording the precise positioning data contained in the beacon messages.

A complementary step is provided of:

comparing the precise positioning data (on board) the vessel given by the onboard Global Positioning System (GPS) with the precise positioning data of the beacon given by the GPS equipment on board the beacon, for determining, with ultra-high precision and by differential calculation, the beacon's position relative to the vessel.

A complementary step is provided of:

updating the display of MOB positioning data by displaying the successively recorded precise positioning data of the beacon.

Advantageously, the overboard location and/or beacon positioning data are determined to an accuracy of within less than ten meters.

Provision is made for the display of the precise positioning data of the overboard and/or beacon location to be given in geodesic coordinates.

Provision is made for the display of precise position data to be given in the form of bearing and distance indications.

Provision is made for the positioning data of the overboard location and/or of the successive beacon positions to be transmitted and displayed on a charting screen of an onboard computer.

Preferably, by means of the onboard computer, the route to be followed (TRK) and/or the waypoints (WPT) are determined as far as the overboard location (MOB) or as far as the beacon position (BLS).

Advantageously, the route to be followed (TRK) and/or the waypoints (WPT) are communicated to the automatic pilot so that the vessel automatically travels to the site of the distress.

An additional step is provided in the event of no signal reception from an individual portable transmitter consisting of:

automatically setting the vessel in stationary movement.

According to one alternative, a field of magnetic coils arranged around a magnetic compass that is part of the vessel's automatic pilot system, is activated and modulated so as to deviate the compass onto a fictitious North or South so that the automatic pilot imparts a stationary circular pathway to the vessel's course. According to another alternative the field of magnetic coils, arranged around a magnetic compass that is part of the vessel's automatic pilot system, is activated and modulated to deviate the compass onto a fictitious North or South in relation to the direction of the wind so as to maintain the vessel in "headed into the wind" configuration with slack sails, in stationary position.

As a variant, one or more engine cut-outs can be activated.

Provision is made, in the event of no signal reception from an individual portable transmitter, consisting of:

automatically setting in action Distress Alert procedure comprising the activation of at least one radioelectric station installation on board the vessel, the triggering of at least one distress alert broadcast under the Global Maritime Distress and Safety System (GMDSS) as defined by the International Maritime Organisation (IMO.).

According to one first alternative, the distress alert procedure is addressed to coast stations and/or other vessels in the area and is characterized by a step consisting of:

triggering a radio distress alert broadcast by Digital Selective Call (DSC) that is part of the Global Maritime Distress and Safety System (GMDSS) as defined by the International Maritime Organisation (IMO).

Advantageously the distress alert broadcast by Digital Selective Calling (DSC) comprises positioning data automatically recorded at the time the distress procedure is triggered, in addition to the time of the call, the area code of the call, the identity of the vessel's station and possibly other codes.

Alternatively the distress alert procedure is addressed to a space radiocommunications service and is characterized by a step consisting of:

triggering the broadcast of a distress alert via a satellite in the INMARSAT satellite network of the INternational MARitime SATellite Organisation.

Preferably, the distress alert broadcast is made by triggering a terrestrial station of the vessel that is part of the IMMARSAT satellite network, the broadcast corresponding in particular to standard channel C and/or the capacities of Enhanced Group Calling (EGC) of the International SafetyNET Service, in particular in the 1.6 GHz radiocommunications band.

Finally, the steps are also provided of:

automatically detecting ship damage, in particular rises in the vessel's water level, detecting fires on board and/or detecting excessive lean of the vessel by means of sensors via an alarm unit, and of automatically triggering distress alert procedure in the event of detection of damage to the vessel.

Other characteristics, purposes and advantages of the invention will become better apparent on reading the detailed description given below of the implementation of the invention and of preferred embodiments given as non-restrictive illustrations with reference to the appended drawings.

BRIEF DESCRIPTION OF THE DRAWINGS

In the appended drawings:

FIG. 1 is a synoptic overall diagram of a first example of embodiment of the system of the invention, FIG. 1A is a synoptic diagram of the radiomonitoring receiver device linked to an individual radio transmitter unit, FIG. 1B is a synoptic diagram of the radio-transmitting beacon of the invention, equipped with GPS, modem radio, and a radar transponder with the central processing unit and power supply means, FIG. 2 shows a schematic view of a floating locator and survival beacon of the invention showing the arrangement of radio antennae, GPS, radar transponder, flashing light and life raft, FIG. 3 gives slightly overhead side views of a first embodiment of a locator and survival beacon of the invention and of a device for jettisoning a beacon of the invention, FIG. 3A showing a body view of the beacon and FIG. 3B showing the beacon in ready position within the jettisoning device.

FIG. 13 is a detailed functional electronic schematic of preserved input/output coupling stages (to optocouplers) between the radiomonitoring device interface in FIG. 11 and a first jettisoning device, FIG. 14 is a detailed functional electronic schematic of preserved input/output coupling stages (to opto-couplers) between the radiomonitoring device interface in FIG. 11 with a second jettisoning device, FIG. 15 gives interfacing/piloting details of RS232 serial link transmission between the interface in FIG. 11 of the radiomonitoring device and the modem radio receiver/transmitter intended for the beacon, FIG. 34 is an oblique view of the charging device for the individual portable transmitters according to the preferred embodiment of the invention, view 34B showing a cross section view of the device in the centre of a transmitter charging position.

DETAILED DESCRIPTION OF THE PRINCIPLE OF THE METHOD OF THE INVENTION

Figure 3:
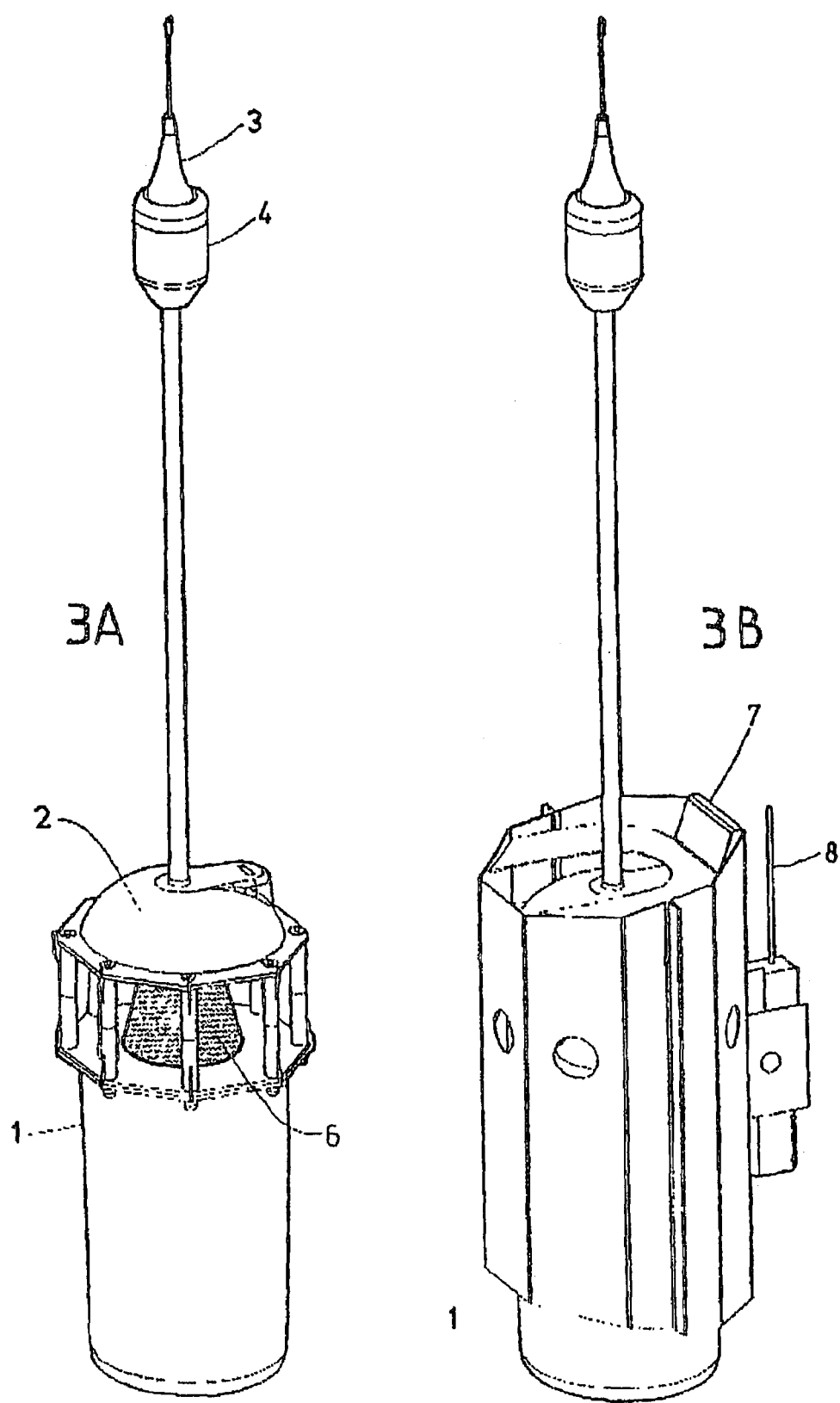

The method of the invention to detect the loss overboard of a crew member or members, whether at sea or on a lake, is based upon the use of a system comprising one or more individual portable radio transmitter units linked to a radiomonitoring device able to receive regular radio transmissions from each individual portable transmitter, to listen to and permanently scan the regular reception of radio signals from the transmitters so as to control and monitor the presence and identification of each transmitter on board the vessel.

The individual portable radio transmitter unit is intended to be worn by a crew member, the method providing for each of the crew members or at least some of the crew members to be equipped with an individual portable transmitter.

Each radio transmitter is similar to a tachograph.

Should a crew member be lost overboard, the regular radio link between the transmitter and the radiomonitoring device is interrupted.

The link is interrupted naturally since radio waves are ill transmitted in water. Also, since the vessel moves away from the overboard person and provision is made for the radio transmitter to have a short range—in the order typically of around ten to one hundred meters, this link is necessarily cut off.

Also, immersion of the transmitter causes a short circuit preventing radio transmission.

More precisely, the radio transmitter of the invention is made to be watertight but comprises power supply or transmission contact terminals whose short-circuiting commands stoppage of radio transmission.

On board the vessel the radiomonitoring device which monitors reception of radio signals transmitted and controlled by each transmitter is able to detect immediately when there is no signal reception from an immersed individual portable transmitter.

The device therefore automatically detects the loss of the corresponding crew member.

The system then sets distress procedure in action.

The radiomonitoring device therefore acts in similar manner to medical monitoring equipment used by emergency and relief services for the permanent recording of physiological phenomena and to give an alarm when disorders occur.

Herein the term radiomonitoring designates the technique of radioelectric scanning or monitoring of a complex radio transmission/reception system using a device called a monitor or scanner which captures and records radio transmission parameters, and signals any abnormal development. The monitor is also intended to display position data on a display system or screen in similar manner to a network display or monitoring screen.

Other more advanced aspects of the individual portable radio transmitters and of the radiomonitoring device will be detailed below after describing the actions triggered under distress procedure.

Three basic actions are provided by the distress procedure of the invention. These three basic actions may be implemented independently, alone or preferably in combination.

The three basic actions of the distress procedure are the following.

The first action consists of automatically recording positioning data given by a satellite Global Positioning System, known under the acronym GPS, or any other equivalent system, the position computing equipment being arranged on board the vessel.

Preferably, provision is made for a GPS unit to be dedicated to the onboard safety system by linking or associating it directly with the radiomonitoring device.

Immediate recording of GPS positioning data gives highly precise knowledge of the site of the distress incident, i.e. the point where the person fell overboard.

On crewed vessels the distress positioning data can then be communicated to the other crew members who will then be able to redirect the vessel and return promptly to the distress site for the immediate recovery of the overboard person or persons.

This arrangement is of capital importance for rescuing an overboard person, since such person's own vessel is the one closest and the most concerned for effecting recovery of a crew member. Since other vessels and sea rescue networks send calls to aircraft or reconnaissance vessels, it generally takes several hours to travel to the scene when there is little hope of rescuing the overboard person having regard to problems related to location, drift and survival of the overboard person who may be injured in low temperature waters.

It is therefore essential for other crew members of the vessel from which the person fell overboard to have immediate, highly accurate knowledge of the overboard person's position so as to redirect the vessel and return promptly to the exact location of the overboard.

Consecutively, the invention provides for the automatic triggering of an alarm on board the vessel to alert the remainder of the crew of the loss of a crew member and immediately display the precise positioning data recorded by the GPS equipment at the time the detection was made of no signal reception from an individual portable transmitter.

The second action of the invention's distress procedure consists of jettisoning and automatically activating a floating locator and survival radio transmitting beacon, immediately at the time no signal is received from an individual portable transmitter.

The beacon of the invention also comprises another GPS positioning unit linked to a radiotransmission device.

The locator and survival beacon of the invention is then able to communicate its position accurately to its vessel of origin.

The vessel is therefore equipped with radio means for receiving the radio signals transmitted by the beacon and with means for extracting data on the exact positioning of the beacon contained in the radio messages sent by the beacon.

The method of the invention therefore provides for the recording and display of the position data sent by the beacon's radio messages.

More precisely, the positioning calculations made by the beacon GPS equipment are generally not available immediately after activation of the beacon, since the GPS unit needs a certain amount of time to set up links with the Navstar satellite network of the Global Positioning System (GPS).

It takes a few minutes, typically one to two minutes at the present time, for a GPS unit to determine its position after being set in operation.

It is therefore advantageous, initially, to display the overboard position sent by the GPS unit on board the vessel, and secondly to update the display with the beacon position data sent by radio messages.

The beacon regularly emits radio messages giving its position.

In the preferred embodiment of the invention, the radiomonitoring device on board the vessel also comprises means for transmitting radio signals and can send polling messages to the beacon which replies by giving its position by return radio message.

It is to be noted that the radio messages sent by the beacon may be captured and decoded by vessels other than the vessel of origin if they are equipped with the same safety system. The radio messages sent by the beacon contain Mobile Maritime Service Identity data (MMSI number).

By way of indication, provision is made for the beacon to transmit radioelectric messages in decimetric waves at ultra high frequency in the band at around 868 Megahertz or in the band around 869 Megahertz.

Subsidiarily, provision is also made for recording the time at which the absence was detected of a signal from an individual portable transmitter or the time lapse since such time and to display on command the recorded time or time lapse by means of the radiomonitoring system of the invention.

This indication may be of use for single-handed sailing or with two crew members if the distress is ascertained a long time after the person fell overboard to estimate the drift due to sea currents and the probable location of the overboard person and beacon.

The beacon of the invention is also equipped with a radar transponder.

As shown in FIGS. 2 and 3, the radar transponder is arranged on a mast surmounting the floating body of the beacon, so as to hold the radar transponder and the radio transmission antenna at height above sea level to increase the locating range.

The beacon's transponder is used for the remote locating of the beacon by means of a radar screening device.

The radar transponder proves to be especially useful in cases when the GPS positioning equipment is not operating or when the beacon is out of radio range. Advantageously it also enables other vessels or rescue means not equipped with the sea safety system to locate the beacon and travel to its position.

Provision is also made for the beacon to comprise a lantern, preferably a long-distance halogen intermittent flashing light.

With this arrangement the overboard person is able to find the beacon jettisoned immediately after falling overboard and to direct himself/herself to it while awaiting rescue.

The beacon may also comprise survival means for the overboard person. A life raft may be placed inside the floating body of the beacon for example.

Considering the size of life rafts, the invention makes provision for arranging the life raft in a separate floating container joined to the beacon by a rope. The rope is preferably fluorescent and its length a few dozen to around one hundred meters to increase the overboard person's chances of reaching the beacon-container assembly. The overboard person is then easily able to pull the beacon or the container towards himself/herself.

Advantageously, the container may, in addition to the life raft, contain a survival kit and a VHF transceiver, even a satellite telephone.

The transceiver proves to be particularly useful for moral assistance to the overboard person and hence his/her survival since contact can be made with other crew members or with other vessels in the area.

The container is released at the same time as the beacon by another automatic jettisoning device.

The beacon and container jettisoning devices are set in operation at the same time by the radiomonitoring device as soon as no signal reception is detected from at least one individual portable transmitter.

Advantageously, the device of the invention is able to release the beacon with the container within a time interval of one to a few seconds, in particular less than five seconds.

A vessel can frequently achieve speeds of up to 10 to 20 knots (5 to 10 m/s) and transatlantic racing yachts are able to reach speeds of 30 to 40 knots (15 to 20 m/s), speeds of 50 knots (26 m/s) even being targeted in the future. At such speeds, in five seconds the vessel can distance itself from the overboard person by 25 meters (28 yards) to 130 meters (140 yards).

At these distances it remains possible for a person lost at sea to locate the beacon light and make way towards it while awaiting rescue.

Also, for the vessel crew, the display of the overboard position given by the onboard GPS unit makes it possible to reach an accuracy of less than one hundred meters (110 yards) and typically an accuracy in the region of 10 meters (11 yards).

Moreover, the invention makes provision for combining the beacon's GPS positioning data with the on-board GPS positioning data.

Such accuracy combined with such locating rapidity amounts to a major contribution of the invention. Known locating radio beacons often encounter problems to enter into contact with their satellite network during crossovers or absence windows, problems which may last up to a few hours.

In a recent case, the Argos beacon of the distressed vessel was only detected after a time lapse of seven hours and the crew members were all lost.

By comparing the positioning data sent by the two GPS units separated by a certain distance, the positioning inaccuracies of the GPS units cancel each other out and an ultra precise measurement of the distance separating the two GPS units is obtained. This principle is used in Differential Global Positioning Systems, DGPS equipment, by referring to a retransmitting station whose location is known with great accuracy.

However this service requires a special subscription and costly equipment.

In the present invention, the distance separating the vessel from the beacon is given ultra-precisely using this principle, but without the need to have recourse to DGPS equipment and at every point of the globe.

Therefore comparison of vessel GPS data with beacon GPS data can be used to accurately locate the position of the beacon relative to the vessel to within only a few meters (a few yards).

In practice, the positioning error using comparative measurements between two GPS units is less than ten or so meters (ten or so yards), within the order of one to about ten yards).

The display of positioning data is preferably made on an alphanumeric screen which may comprise two lines of 16 characters to display geodesic coordinates of the distress position and of the beacon in latitude and longitude corresponding to the above-mentioned accuracy.

Display is preferably made on the radiomonitoring device of the sea safety system, since it can receive position data given by the vessel's GPS and the beacon's GPS, to compare the same and to regularly update the display with the successive positions of the beacon after it has been polled by radio signal, in particular by demodulating its reply.

Alternatively, it is possible to communicate the position data of the overboard location and/or of the beacon obtained by the device to an onboard computer equipped with electronic marine charting software so as to display the position data of the overboard, and of the beacon on a two-dimensional charting screen with all the mapping indications provided by the computer (coastlines, reefs, etc . . . ).

With said arrangement the onboard computer can automatically calculate the route to be followed or possibly the waypoints as far as the overboard location or beacon position. Also the computer can optionally communicate the route to be followed to an automatic pilot system so that the vessel automatically travels to the overboard location or beacon position so that the other crew members can search for the overboard person.

The above description of the recording of vessel position data given by GPS equipment, of the release of a radiotransmitting beacon also equipped with a GPS unit to transmit the beacon's position data for display on an on-board screen, chiefly concerns use on a vessel with several crew members insofar as it is necessary that at least one other crew member must be alerted on board the ship and must read off the position data to redirect the vessel to the site of the distress incident.

The present invention also concerns single-handed sailing and provides for a third basic action for cases when the single sailor is lost overboard, consisting of automatically triggering a distress alert under the Global Maritime Distress and Safety System (GMDSS) set up by the International Maritime Organisation (IMO).

Most vessels, even pleasure boats, are equipped with a radioelectric installation with which to transmit and receive Digital Selective Calls (DSC) in metric waves in the frequency band of 156 to 187 Megahertz, precisely at 156.525 Megahertz on channel 70 of the very high frequency VHF band.

These installations are intended to send Distress Alerts from the navigation station and to be on constant Digital Selective Calling (DSC) standby on channel 70 of the VHF metric waveband. With the GMDSS system it is possible for Distress Alerts to be sent from the vessel to other vessels and are automatically retransmitted from vessel to vessel as far as coastal stations which give a general alert and send rescue teams.

It is also recommended that ocean-going vessels should be equipped with a "terrestrial" radio-communications station within the INMARSAT geostationary satellite service of the International Maritime Satellite Organisation, so that they can transmit a Distress Alert on standard channel A, B or C, channel C in the 1.6 GHz radiocommunications band being recommended.

According to the invention, provision is made for the use of an onboard radioelectric installation and to automatically trigger the sending of a Distress Alert by activating dry contacts on one of these installations.

Distress Alert transmission installations comprise MMSI (Mobile Maritime Service Identity) identification numbers and their own satellite GPS unit, and they automatically broadcast a Distress Alert radio message giving the time of transmission, the identity of the transmission station and the positioning given by GPS equipment.

Under Digital Selective Calling the transmitted position data are limited to an accuracy of one thousand over one square thousand. This is the most widespread system.

The third action of the method of the invention, in the absence of signal reception from an individual portable transmitter, then consists of automatically activating an onboard radioelectric station installation triggering the radio broadcast of a Distress Alert via Digital Selective Calling.

The invention provides that the radiomonitoring device simply sets in action the DSC distress alert installation by actuating a dry contact existing on said installations.

Advantageously, the automatic triggering signals the distress immediately to other vessels within the area whose installations automatically and indisputably record the Distress Alert data, set in action an alarm signal on board and automatically retransmit the alert to other vessels adding their own identification, position and time of retransmission.

All nearby vessels are therefore informed of the distress immediately and can arrange to send rescue.

Provision is made to continue broadcasting distress alerts for as long as a person on board the vessel from which the distress originated does not deactivate the device manually.

Therefore, in the event of a single-handed sailor falling overboard or the capsizing of an entire vessel, the alert is maintained so that other vessels can travel to the scene.

Once on site, the other vessels can automatically locate the position of the overboard person more accurately by searching and locating the beacon of the invention using a radar screening device.

Alternatively, they may poll the radio beacon of the invention if they themselves are equipped with the sea safety system of the invention.

Preferably, the Distress Alert is transmitted by automatically activating a terrestrial installation of the vessel that is part of the INMARSAT system on standard channel C, i.e. on the radiocommunications band at 1.6 GHz.

This preferred Distress Alert model has the advantage of communicating complete GPS positioning data, i.e. to an accuracy in the order of around ten to one hundred meters.

The automatic triggering on INMARSAT standard channel C therefore has the advantage of giving other vessels more accurate positioning of the distress point.

It is obvious that the two types of Distress Alerts may be triggered automatically and concurrently if the vessel is equipped with the two types of installations.

For use during single-handed sailing on pleasure boats in particular, provision is made for a further important action consisting of automatically placing the boat in stationary movement. This arrangement is particularly important so that the overboard person can return to his or her boat.

On motor boats, it is possible to automatically cut out the engine ignition or the power supply to the engine or engines to immobilise the vessel.

On sailing vessels equipped with an automatic pilot, particular recourse may be made to another mode of action consisting of causing the vessel to move over a circular stationary course.

Said stationary movement is obtained by following in particular the teaching of international application WO 98/38083 in the name of the applicant whose teaching is incorporated herein by reference.

Stationary movement is achieved by fitting the magnetic compass of the boat's automatic pilot with a system of magnetic coils arranged about the compass rose.

If the absence is detected of signal reception from an individual portable transmitter worn by a person sailing single-handed, the magnetic field produced by the magnetic coils is activated and modulated so as to lock the compass onto a fictitious North or South direction.

By reaction, the automatic pilot seeking to restore the boat's course that has been fictitiously diverted, will act upon the boat's controls to cause it to turn. Since the compass remains locked in position, the yacht will continue to turn indefinitely in circles.

Alternatively, according to another improved mode of action, provision is made to hold the vessel in "headed into the wind" configuration i.e. substantially facing the wind with slack sails, in stationary position.

Said procedure requires detecting the direction of the wind via an electronic weather vane and modulating the magnetic field of the coils to cause the vessel to turn in this direction, followed by different modulation of the magnetic field of the coils so as to cause the pilot to act as if the vessel is directed on its set course. The vessel will then remain fixedly oriented in the direction of the wind, with slack sails, and will become immobilised.

EXAMPLES OF USE OF THE INVENTION

It is clearly evident that the onboard safety system of the invention can be adapted to most vessel configurations by choosing modes of action suited to each vessel configuration.

A distinction can be made between four configurations and four scenarios for distress action and procedure.

1. Scenario N° 1—Single-handed Sailing Vessels

When the system is used for single-handed sailing and should the sole yachtsman fall overboard, it is not necessary to record and display positioning data on board the vessel nor to trigger an onboard alarm.

On the other hand, it essential to jettison a locator and survival beacon of the invention and to automatically trigger a distress alert on Standard Channel C of the INMARSAT system or by Digital Selective Call (DSC) under the GMDSS system to set in action the sending of rescue teams or the arrival of other vessels within the area.

The rescue services then know the original position of the distress and can poll the beacon by radio means to update the precise positioning of the beacon. Alternatively, the rescue services can search and locate the beacon by radar screening.

It is also essential to stop the sailing vessel.

The sea safety system of the invention must then be configured to act upon the coils of the magnetic compass, either to maintain the vessel in a stationary circular course or to place the vessel "headed into the wind"

2. Scenario N° 2—Single-handed Motor Vessels

This case is similar to the preceding one with the exception that the system must be configured to automatically cut out the engine.

3. Scenario N° 3—Crewed Vessel with Loss of a Crew Member

Crewed vessels whether motor vessels (fishing boats, merchant navy . . . ) or sailing vessels (racing boats) are evidently too heavy for their course to be given sudden automatic deviation.

It is not recommended under these conditions to act upon the magnetic compass of an automatic pilot, nor to cut out the engine.

The basic actions in this case consist of recording and displaying MOB positioning data, of triggering an on-board alarm and of jettisoning the locator and survival beacon of the invention.

The other crew members, alerted or woken up, are informed of the distress position by the display of positioning data on a charting screen in particular either in the form of latitude and longitude coordinates or in the form of accurate bearing and distance indications.

The positioning data is then updated as and when successive radio messages are received from the beacon.

The alert of the invention is nevertheless automatically triggered as soon as no signal reception is detected from an individual portable transmitter. Provision is therefore made for the crew to be able to command deactivation of the distress alert broadcasts once another crew member has taken in charge distress procedure or has recovered the overboard person.

4. Scenario N° 4—Loss of Ship/Crew

Provision is also made for triggering distress procedure in the event of detected damage to the vessel, in particular when a rise in water level inside the vessel is detected of if excessive lean is detected (movement, lean, above-limit roll . . .)

In this scenario, the locator and survival beacon or beacons are automatically jettisoned with the container(s) and a general distress alert is sent via Standard Channel C of the INMARSAT system and/or by Digital Selective Calling— before the system is no longer capable of transmitting.

It appears definitely preferable for a distress alert to be triggered as soon as a distress is detected to prepare for a more serious loss such as loss of the vessel.

It is also apparent that the onboard safety system of a vessel can be adapted to each vessel configuration and can advantageously be implemented in the form of a universal sea safety device comprising all the above-cited functions, the universal device possibly being advantageously configured in relation to the intended use.

DETAILED DESCRIPTION OF THE PREFERRED EMBODIMENT OF THE INVENTION

The diagram in FIG. 1 shows that the sea safety system of the invention can be implemented by setting up a central "Radio Receiver Monitor" device forming a radiomonitoring device of the invention, the device being associated with at least one individual portable transmitter unit and with at least one locator and survival radio transmitting beacon.

Figure 30:
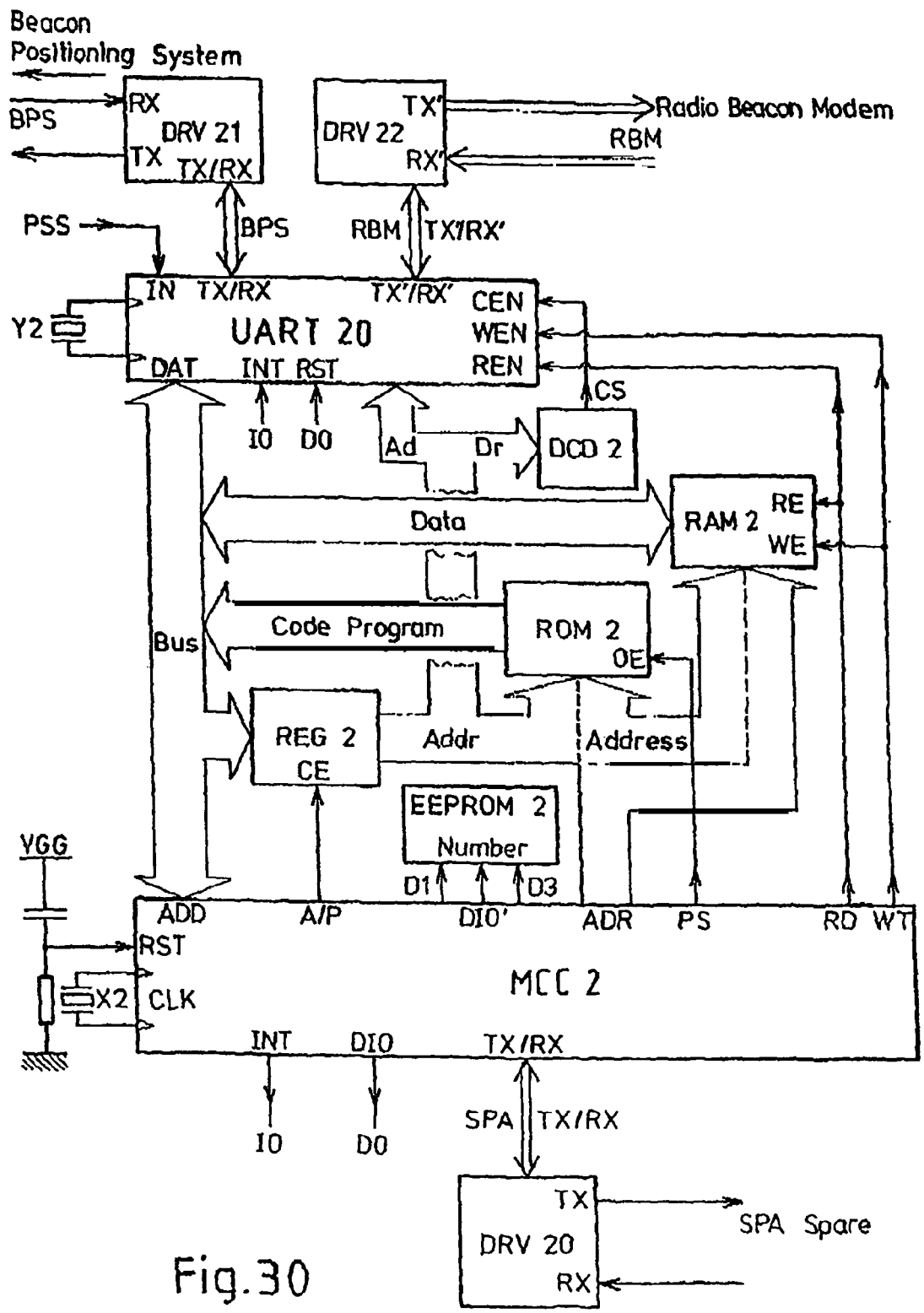
FIG. 30 is an overall functional electronic schematic of the radio transmitter device of the locator and survival radio beacon of the invention, the device comprising a central unit, an interface and input/output pilots linked to the GPS positioning system and a beacon modem radio receiver transmitter intended for the radiomonitoring device on board the vessel, and a spare transmission line.

The individual portable transmitter or transmitters comprise a central CPU module whose preferred embodiment is detailed in FIG. 30. The CPU module is linked to a modem radio receiver transmitter. The CPU and modem radio assembly is advantageously powered by battery packs.

A charging device, "Charger" is provided with which to recharge the battery packs for the individual portable transmitters "Individual Transmitters". The charging device is advantageously connected to and controlled by the central radiomonitoring device.

The "Radio Receiver Monitor" safety device essentially comprises a central processing unit CPU controlling all transmissions within the safety system.

In accordance with the previously described modes of action, the central CPU unit is linked firstly to a satellite link GPS global positioning system.

Secondly, the device is connected to an onboard alarm, to a distress call broadcasting station on board the vessel on Standard Channel C of the INMARSAT system, to "Coils" arranged close to the magnetic compass of an automatic pilot system, and to onboard equipment "Navigation Equipment". The "Monitor" device is linked in particular to at least one device for jettisoning a beacon of the invention as illustrated in FIG. 3B, to means for displaying positioning data or to an onboard computer, preferably equipped with a screen and digital charting means.

The "Monitor" device also comprises a small modem radio receiver transmitter intended to receive radio signals from each individual portable transmitter, and a modem receiver transmitter of greater power communicating with the locator and survival radio beacon, both modems being commanded by the CPU module.

The small modem radio linked to the individual transmitters, is connected to antennae arranged inside and outside the vessel.

Provision is made to equip the vessel with a set of antennae covering all the zones of the vessel leaving no area uncovered so that no false alarm can be given when a crew member and his/her radio transmitter enters an uncovered zone.

Also, the "Monitor" device comprises a powerful modem radio receiver transmitter connected to an UHF radio antenna positioned at the top of the mast or at a top part of the vessel to set up radio links with the jettisoned locator and survival radio beacon(s).

The "Monitor" assembly is connected to the vessel's general power supply.

Means for converting continuous voltage power supply are provided to separately supply the various electronic boards of the modules within the device.

The preferred embodiment of the power supply converters for the various units of the safety device is detailed in drawing 13.

Advantageously, the separate power supplies enable some boards to be "at rest" and others to remain under standby so that each function can be reactivated whenever necessary.

FIG. 1B shows a schematic view of the locator and survival radio transmitting beacon which is therefore linked to the radiomonitoring device via the powerful modem radio receiver transmitter and its antenna when it is in service.

The beacon of the invention essentially comprises a GPS unit associated with radio transmission means formed by a central module unit and a modem radio receiver transmitter. The assembly is powered by a battery pack.

The beacon comprises battery power which can be stored for long periods without discharging, in particular more than two years in accordance with the recommendations of the International Maritime Organisation and national maritime regulations.

The beacon activates itself automatically as soon as it is jettisoned.

So as to operate in low temperature waters and supply the electric energy required by the GPS unit, the CPU unit, the flashing lights and optionally the radar transponder, for a time in the region of one to a few dozen hours, provision is made to provide the beacon with lithium cells.

Generally a few dozen seconds to a few minutes are needed before the GPS can give positioning data.

Figures 31, 32:
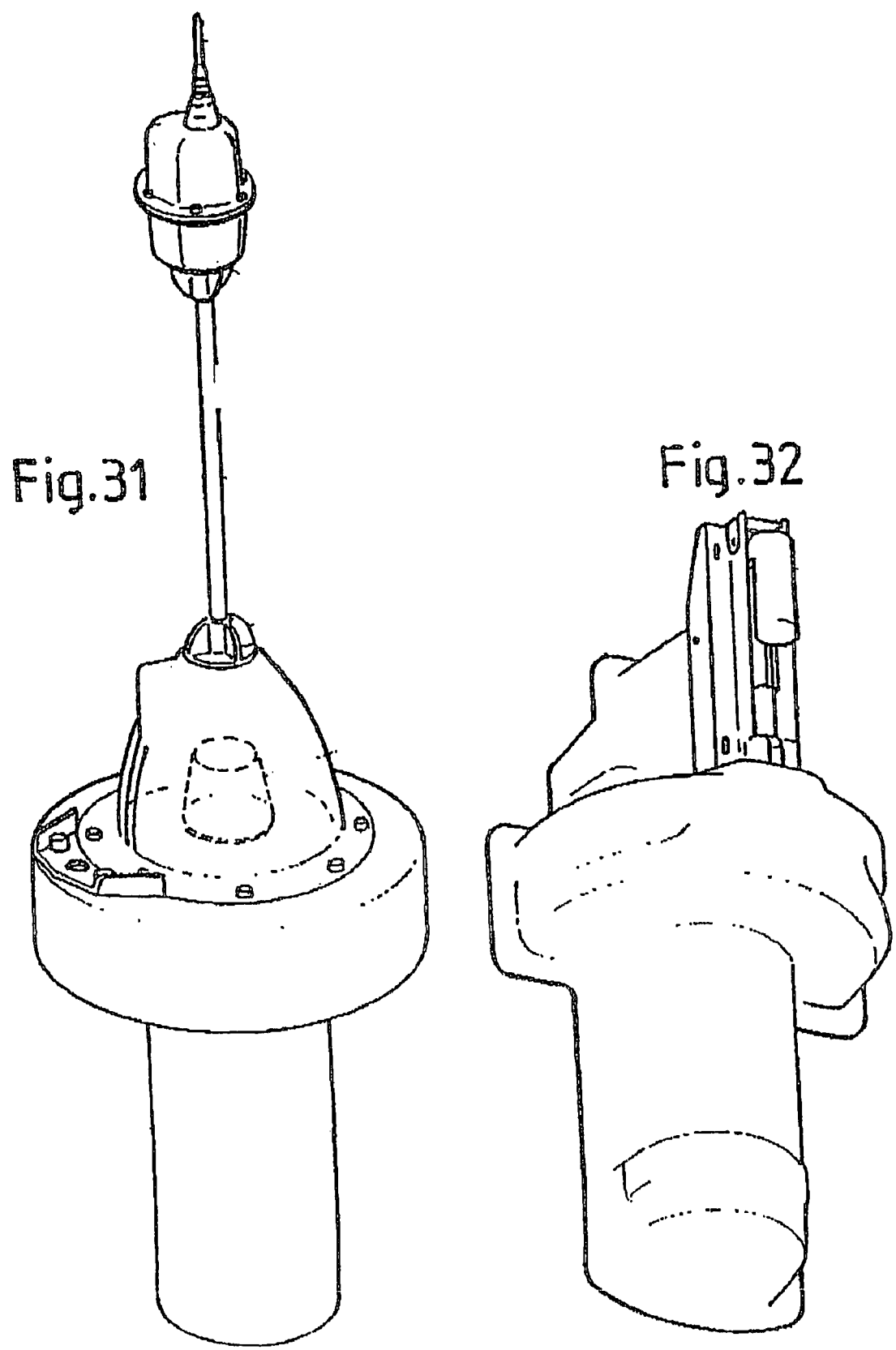
FIG. 31 shows a side view of the locator and survival radio beacon according to a preferred embodiment of the invention, FIG. 32 gives a three-quarter rear view of the beacon jettisoning device according to the preferred embodiment of the invention, FIG. 33 gives perspective views of an individual portable radio transmitter according to the preferred embodiment of the invention, view 33A showing a front view of the transmitter and view B showing a rear view.
Figure 35:
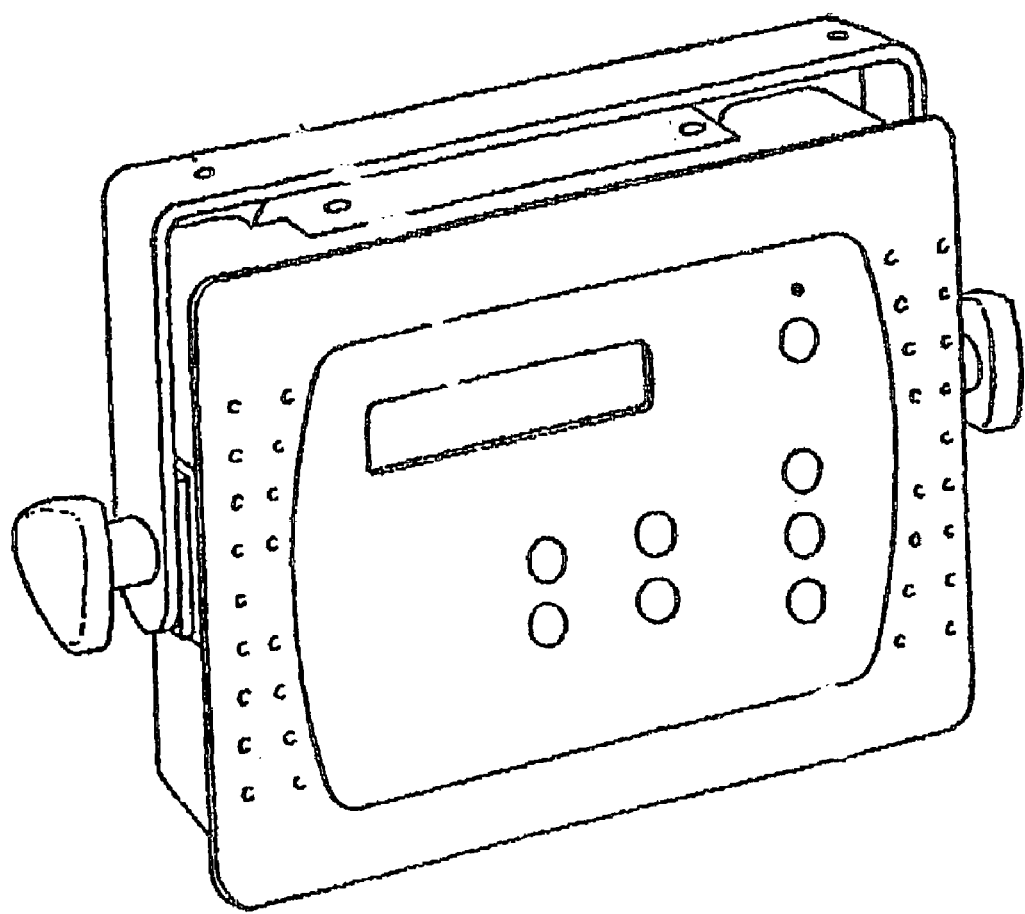
FIG. 35 is an outer oblique view of the radiomonitoring device according to the preferred embodiment of the invention with its keyboard and display screen

Provision is also made for the beacon to be equipped with a radar transponder 4 as can be seen in FIGS. 1B, 2, 3A or with radar reflectors 14 and 14' as illustrated in FIG. 31. The radar transponder offers the advantage of enabling the beacon's position to be identified in the event of absence of radio link of faulty GPS functioning.

The radar transponder 4 can advantageously give an identification signal as recommended by the I.M.O.

Finally, the beacon is equipped with long range flashing lights of halogen type advantageously allowing the overboard person to locate and reach the beacon, especially at night time.

Figure 17:
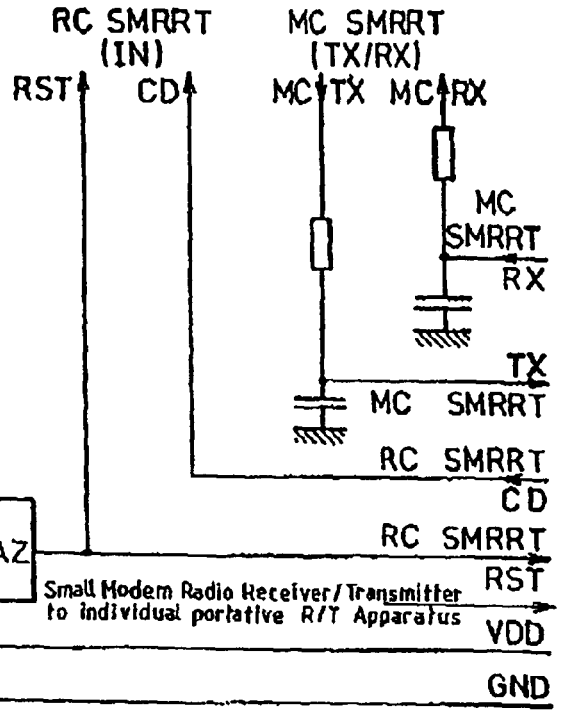

The central processing unit whose preferred embodiment is detailed in FIG. 17 is able to retransmit the beacon's precise positioning data sent according to standard protocol NMEA0183 by the GPS positioning device.

Preferably, provision is made for the "Monitor" on board the vessel to send an identification radio signal so that the beacon replies by returning its precise positioning data in a radio message intended for the "Monitor" device on his/her personal vessel or any other vessel equipped with a similar device.

Advantageously, the radio signal transmissions sent by the beacon contain identification data such as the MMSI number (Mobile Maritime Service Identity).

It is also possible to provide for the radio transmission between the beacon and its vessel to be protected by identification codes.

According to the preferred embodiment of the beacon illustrated in FIG. 30, the central CPU unit comprises a MCC2 microcontroller able to store identification data, in particular a MMSI number, in a non-volatile electrically erasable EEPROM2 memory. The beacon's central module unit conventionally comprises a ROM2 memory to store its program for receiving precise positioning data from the beacon positioning system BPS, transmission routines for radio polling signals and radio reply.

The radio link between the beacon and the "Monitor" device is preferably set up in ultra high frequency waves (UHF) or in micro waves.

Advantageously, the choice has been made to use the frequency band around 868 Megahertz and the frequency band around 869 Megahertz depending upon countries, which makes it possible to transmit freely at high power.

A power in the order of one to several hundred milliwatts is required to establish a long-range radio link, in the order of one thousand to ten thousand nautical miles (approximately 2 km to 20 km) which is suitable for the application. Other wavebands, in particular at very high frequency VHF may also be chosen.

The locator and survival radio beacon, as indicated in FIG. 1B, therefore contains a modem radio receiver transmitter linked to a radio antenna, preferably adapted for UHF waves.

As illustrated in FIGS. 2 and 3a, the radio antenna is preferably arranged at the tip of a mast mounted on the beacon and rising approximately half a meter to two meters above the beacon's floatation line.

This arrangement of the antennae in raised position above the water is necessary for effective deployment of the radio link range between the beacon and its vessel.

Preferably transmissions by the beacon are made by serial link via an UART 20 arithmetic receiver and transmitter unit using its TX/RX transmitting/receiving ports.

The reception of positioning data from the Beacon Positioning System BPS is made for example via an RS232 serial link as illustrated by the DRV21 interface pilot. Transmissions of radio messages between the beacon and the vessel are made by a beacon modem radio RBM in particular via transmissions by a DRV22 interfacing pilot enabling establishment of a good quality RS422 serial link. A serial TX/RX transmission line is left free at the low output of the MCC2 microcontroller.

FIG. 3A shows a first form of embodiment of the floating locator and survival beacon 1 on which flashing light 6 can be seen in its columned housing surmounted by a radome 2 to house a hemispherical GPS antenna. The radome is surmounted by an antenna mast 3 comprising a maintop 4 to house a transponder.

In FIG. 3B the beacon mounted in its automatic jettisoning device 7 can be seen, formed of a shell on which a hydraulic jack 8 is mounted that is remote controlled electrically to jettison the beacon.

Jettisoning device 7,8 is intended to be commanded by the "Monitor" radiomonitoring device visible in FIG. 1A.

The central unit of the radiomonitoring device is designed to coordinate all radiosurveillance, identification, monitoring and absence detection operations as well as actions consecutive to GPS position recording, alarm triggering, beacon jettisoning and distress alert broadcasting as set forth in the preceding procedure.

Figure 4:
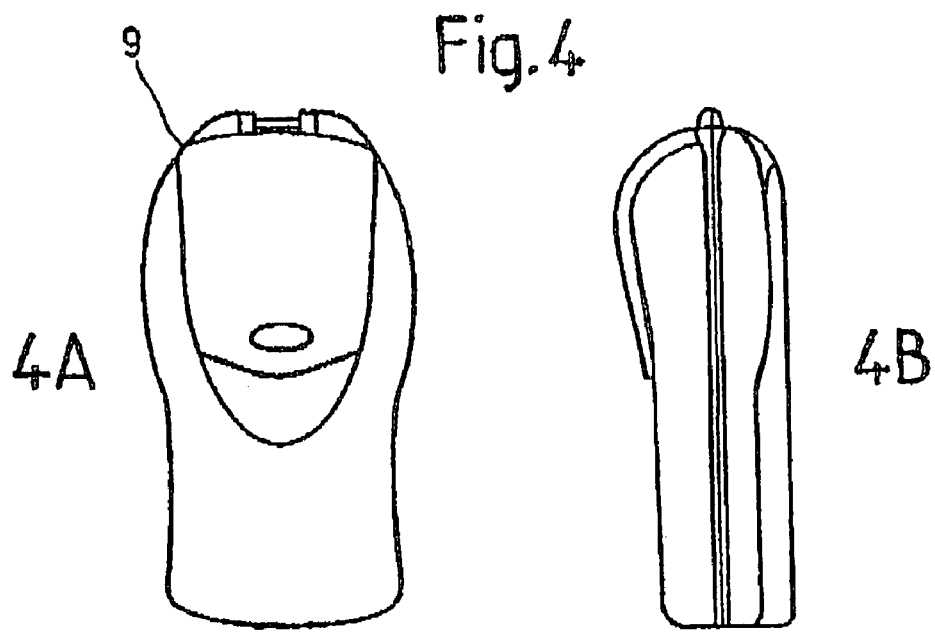
FIG. 4 shows views of an individual portable radio transmitting unit according to one first embodiment of the invention, view 4a showing a front view of the individual portable transmitter, view 4b showing a side view of the transmitter, FIG. 5 gives an outer view of a charging device for individual portable transmitters according to a first example of embodiment of the invention, FIG. 6 gives an electronic layout of the central unit assembly of input/output interfaces of the radiomonitoring device according to the preferred embodiment of the invention.
Figure 5:
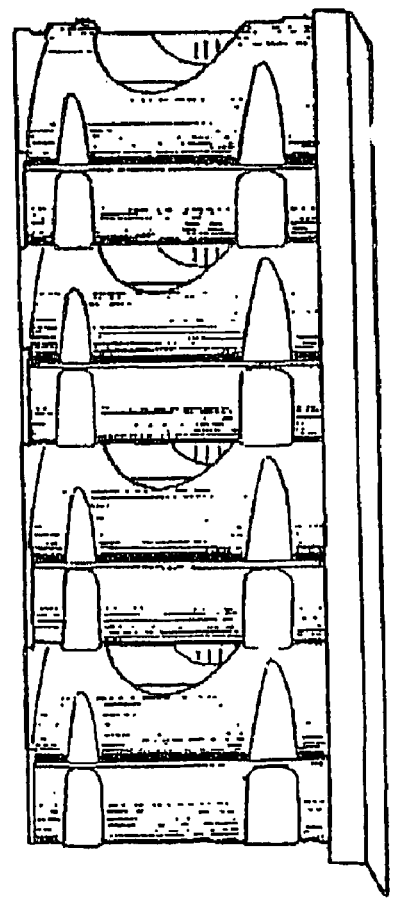
Figure 6:
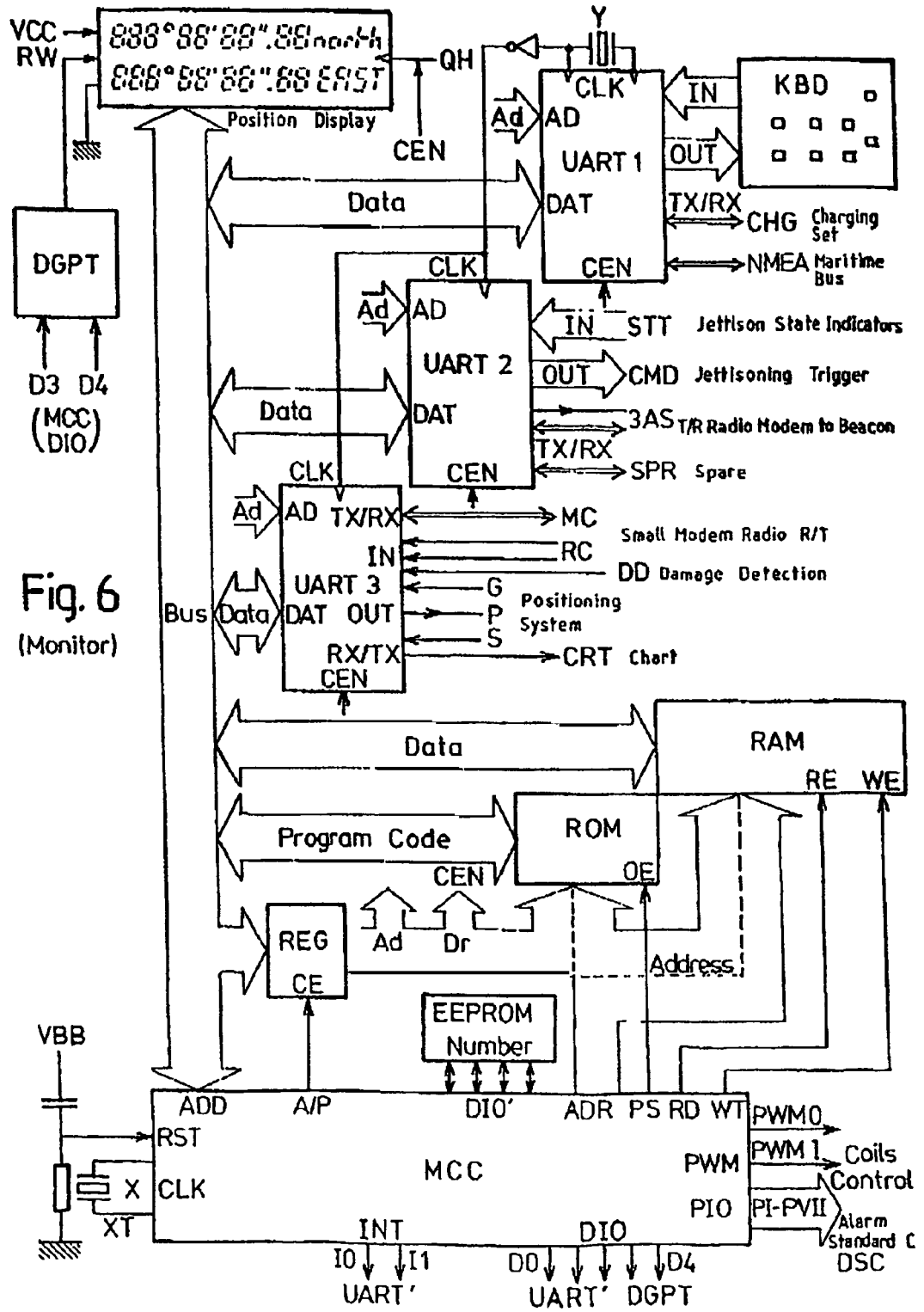
Figure 7:
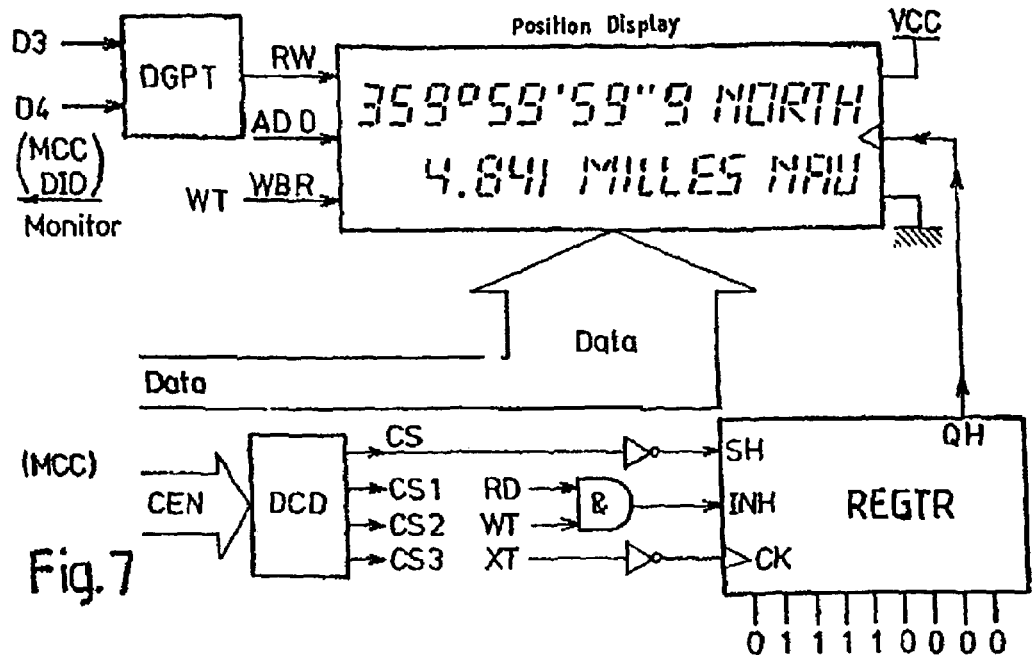
FIG. 7 is a detailed, functional electronic schematic of the positioning display means of the device.
Figure 8:
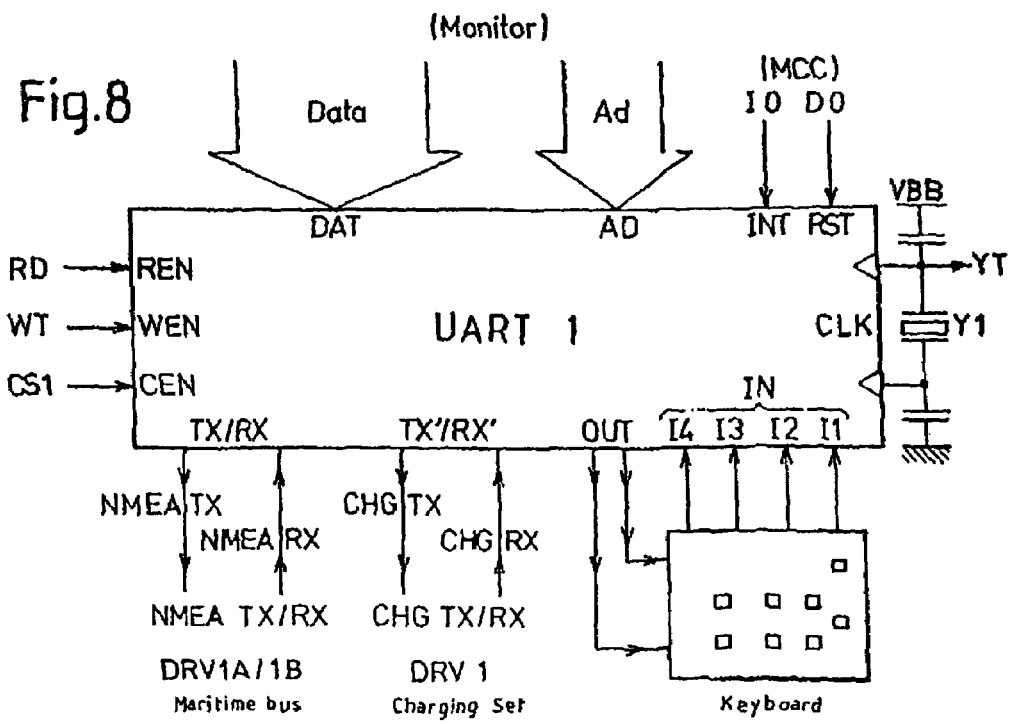
FIG. 8 is a detailed, functional electronic schematic of the interfacing for the transmission means of the device in FIG. 6 with keyboard, transmitter charging devices and a marine bus.
Figure 9:
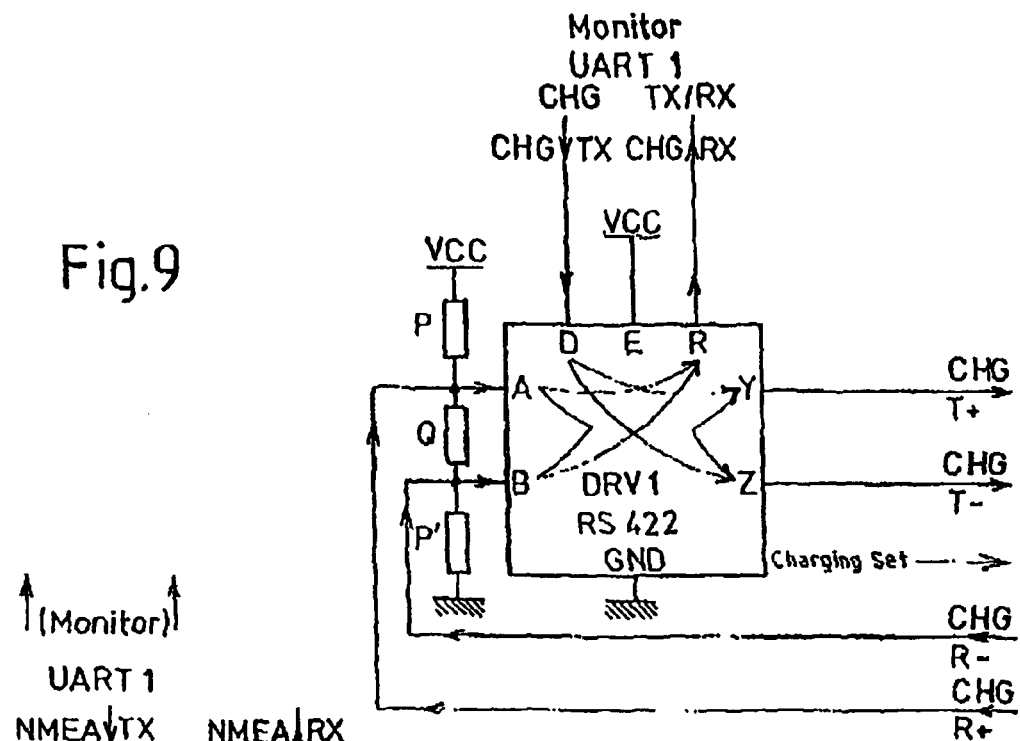
FIG. 9 gives electronic details of transmission interfacing/piloting between the radiomonitoring device in FIG. 6 and the charging devices, FIG. 10 gives details of the transmission interfacing/piloting between the radiomonitoring device in FIG. 6 and the marine bus.
Figure 10:
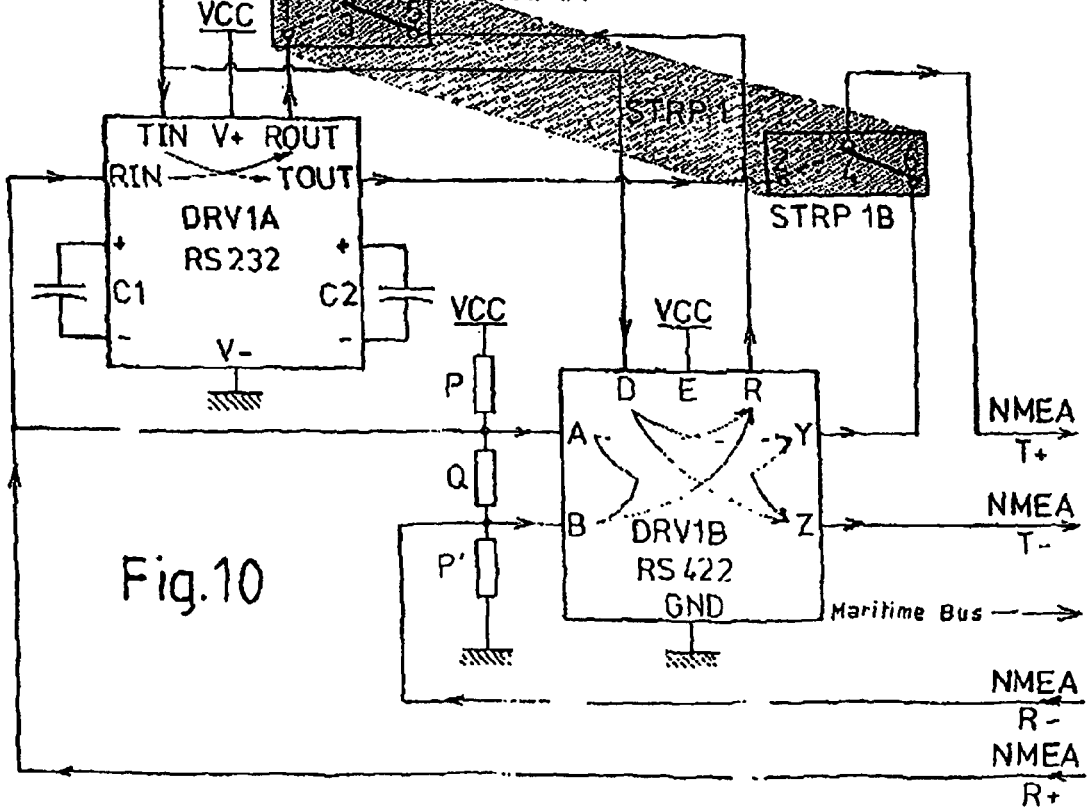
Figure 11:
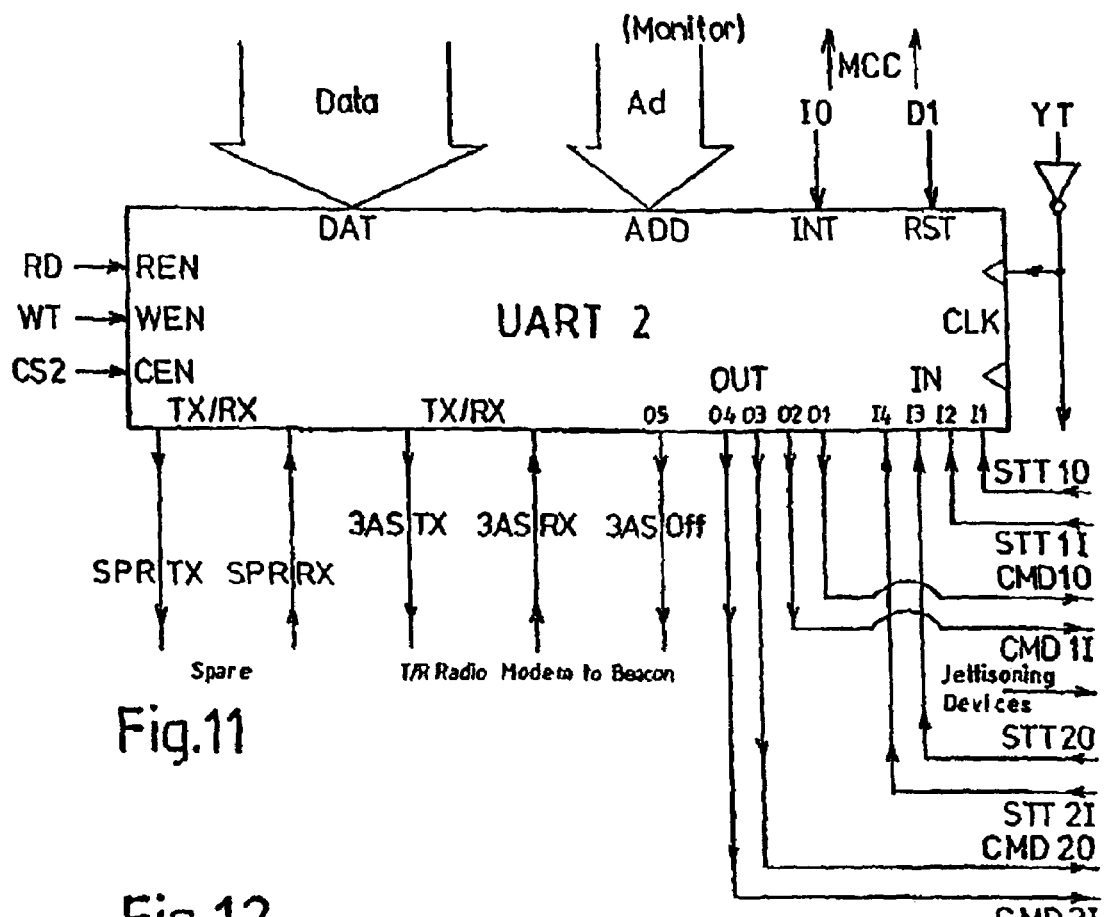
FIG. 11 is a detailed functional electronic schematic of the interfacing of the transmission means of the radiomonitoring device in FIG. 6 with jettisoning devices (jettison status indicators and jettison commands) and with a modem radio receiver transmitter communicating with the beacon, with spare transmission line.
Figure 12:
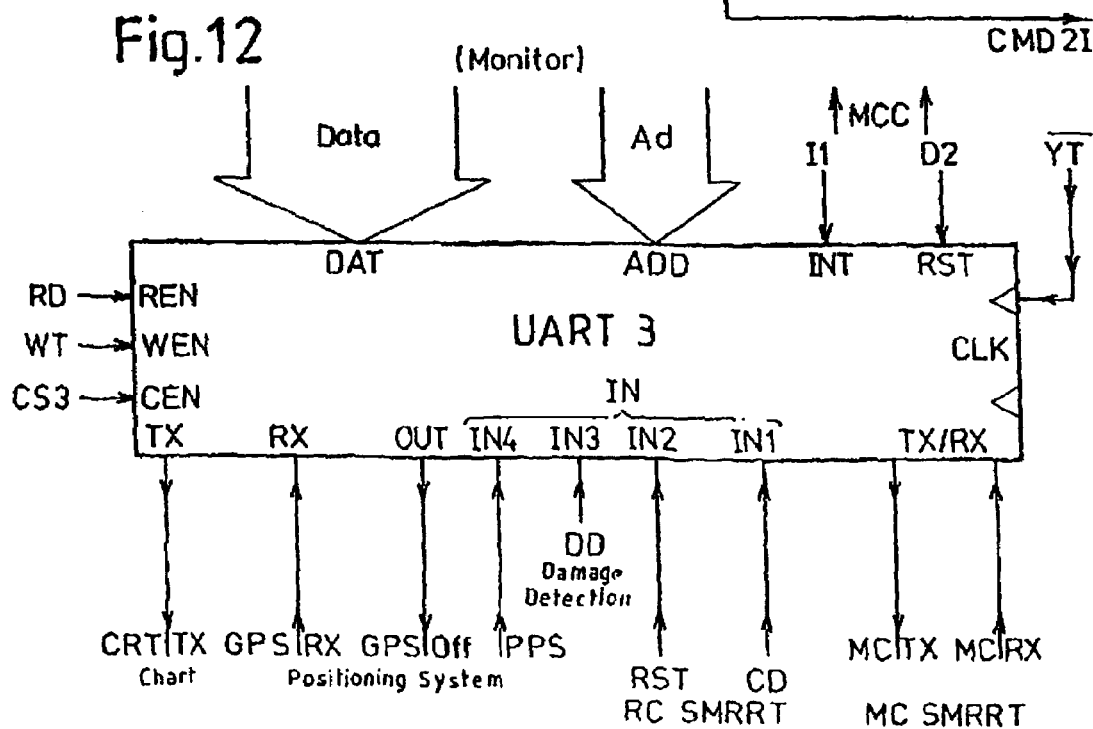
FIG. 12 is a detailed functional electronic schematic of the interfacing of the transmission means of the radiomonitoring device in FIG. 6 with a small modem radio receiver/transmitter (SMRRT) intended for the individual portable transmitter(s), with vessel damage detection means (DD), with the positioning system (GPS) and with electronic board display.
Figure 15:
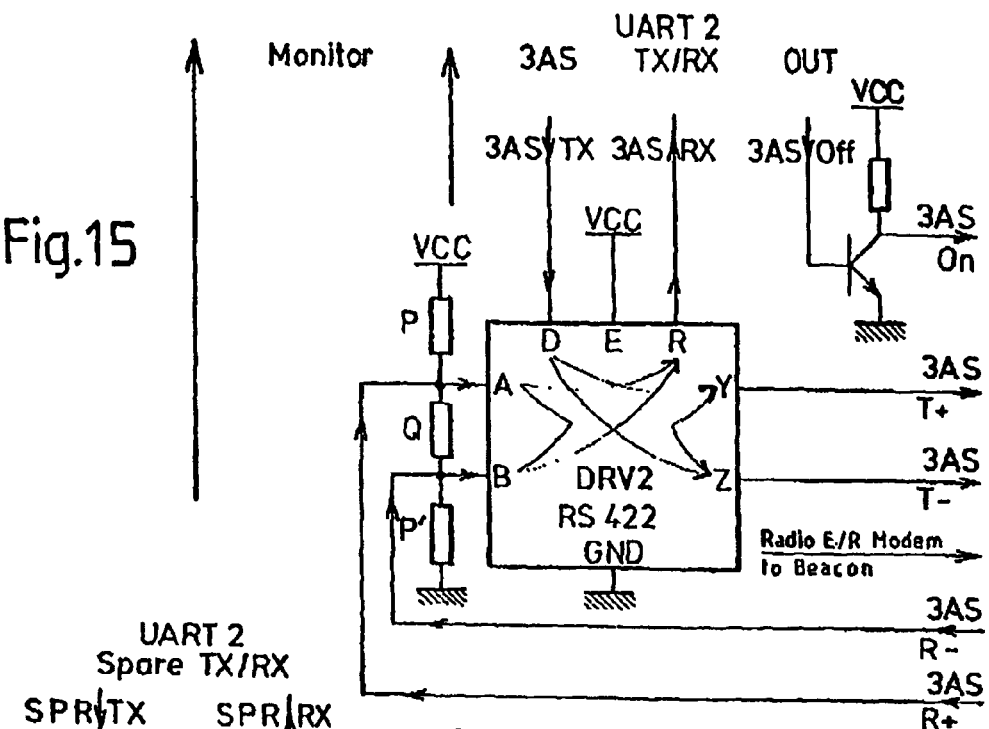

FIG. 4 illustrates the preferred embodiment of the central CPU unit 9 in figure 1A. The central unit of the "Monitor" radiomonitoring device comprises firstly a MCC controller able to implement a programme stored in ROM memory and to exchange "Data" via the Bus with its RAM memory. The data bus of the MCC microcontroller is also linked to a display screen "Position Display" of LCD alphanumeric type for receiving/transmitting arithmetic units to control al the equipment associated with the radiomonitoring device of the invention.

The microcontroller stores the identification numbers of each individual portable transmitter in service in the EEPROM memory.

Under normal operation, the central unit of the radiomonitoring device scans the reception of identification radio signals via the small modem radio receiver/transmitter SMRRT.

The SMRRT modem, not shown, is of a commercially available type.

As illustrated in FIG. 4 the transmission of data from the modem is made on a transmission/receiving TX/RX port. The SMRRT modem can send command signals to the IN port of the UART3 interface. The SMRRT modem can be reset by resetting means RST in the event of a power cut as detailed in FIG. 17.

In accordance with the aforesaid method, the MCC microcontroller of the "Monitor" device monitors the regular reception of radio signals transmitted by the SMRRT modem.

Provision is made for the microcontroller to poll in turn each individual portable transmitter which is not in rest position and which has not been identified on the charger CHG The MCC microcontroller stores the identification numbers of the individual transmitters in EEPROM volatile memory.

In each polling message the MCC microprocessor communicates an identification number to poll the identified individual transmitter.

The transmitter with the corresponding number normally replies with an answer message containing its identification number.

Advantageously, this radio message exchange protocol by polling avoids confusion. The identification protocol prevents the triggering of false alerts in the event of interference when vessels are in port for example.

In the absence of a reply or when there is an identification error, provision is made for the microcontroller to memorise the identification number but does not immediately set distress procedure in action. However, it memorises the precise positioning data given by the GPS and continues the polling cycle of the other individual portable transmitters in service.

During the next polling cycle the device only polls the portable transmitters from which it has not received a signal or proper identification.

After three polling cycles if there is still no signal reception, the device sets the alert procedure in action.

Therefore, advantageously, the device is characterised in that it is able to set in action the distress alert procedure and/or onboard alarm within a time interval of less than five seconds.

If there is no signal reception from at least one of the individual transmitters, the microcontroller can immediately record the GPS positioning data via a serial link of NMEA0183 standard.

Figure 18:
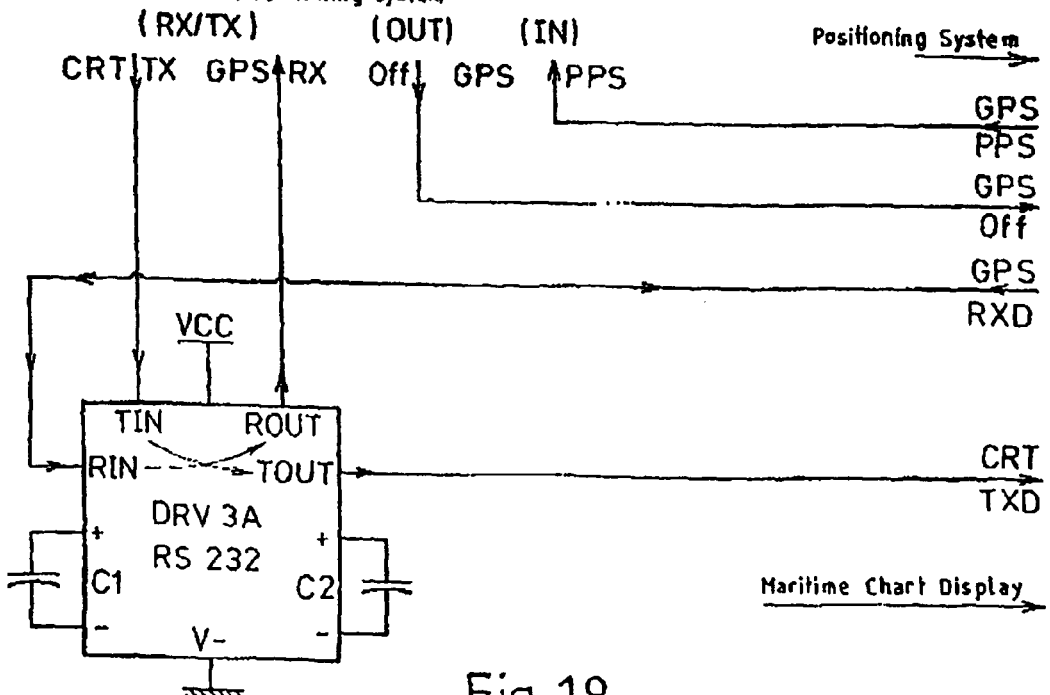

With reference to FIG. 18, it can be seen that the GPS data is received on a GPS RX line passing through a DRV3A interfacing pilot of RS232 standard.

Conversely, the recorded positioning data may be immediately returned to a charting screen via a DRV3 pilot of RS232 serial link to be displayed on a digital sea charting display screen.

Therefore the radiomonitoring device is able to scan the presence of one or more individual portable transmitters to form a safety system onboard a vessel, with which it is possible to detect the loss overboard of one or more crew members, to give immediate alert and accurately (exactly) locate the site of the distress so as to send rescue services promptly enabling rapid recovery of the person or persons lost overboard, the device comprising:

means for receiving identification radio signals regularly transmitted by each individual portable transmitter, means for permanently scanning the regular reception and identification of radio signals transmitted by each individual portable transmitter, means for automatically detecting any lack of reception of a radio signal from at least one individual portable transmitter, and means for automatically recording precise overboard positioning data (MOB) given by a positioning system via satellite(GPS), the precise MOB positioning data being recorded substantially on and after the time that no regular signal reception is detected from at least one individual portable transmitter.

It is to be specified that in the event of distress alert procedure, the microcontroller is able to trigger all the actions listed previously via its UART interfaces.

Figure 19:
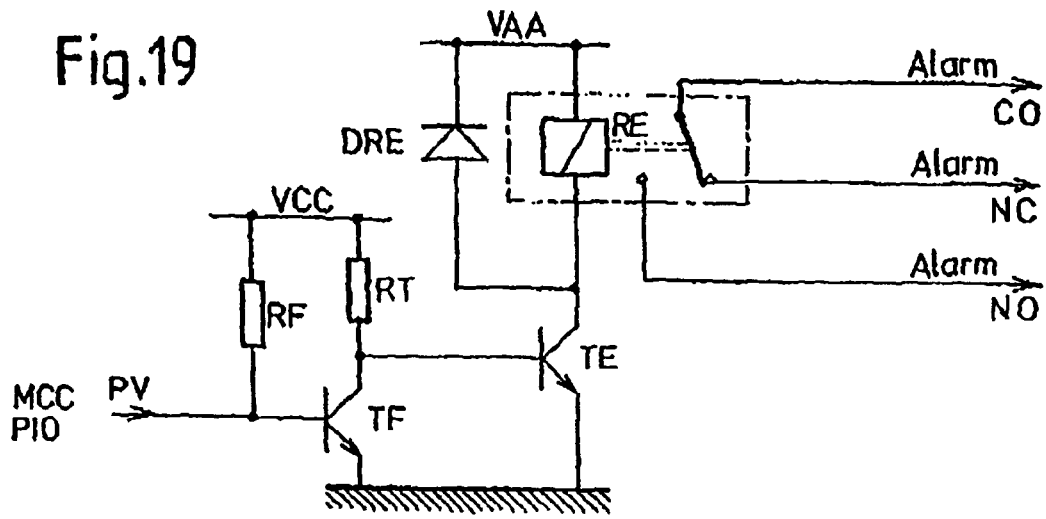

The microcontroller activates the onboard alarm by actuating a relay on the three-status line Alarm CO/Alarm NC/Alarm NO via a PV command on its input/output port PIO. The PV command actuates a relay stage illustrated in FIG. 19.

The alarm may be an audible or visual alarm.

In addition to recording GPS data transmitted on GPS RX, the microcontroller can know the status of the jettisoning means by polling lines connected to jettison status indicators STT which enter on the IN port of the UART2 arithmetic unit. After verifying that the jettisoning means are armed and contain a beacon, the MCC microcontroller can actuate jettisoning via the line "Jettisoning Trigger". It is to be noted in passing that the device is able to carry out inspection of this equipment and even to cause the conducting of self-inspection procedure.

Detection of the status of the jettisoning means is preferably made by means of static insulation lines via a series of optocouplers OPT1 to OPT6. It can also be seen that the STT status measurement lines of the beacon can advantageously be three-status lines CMD2 Open/CM2 Close/Undetermined status.

Similarly, the CMD1 jettisoning command in the event of distress procedure is preferably given by means of three-status lines CMD1 Open/CMD1 Close/Undetermined Status to avoid a false manoeuvre.

To trigger jettisoning of the beacon, the microcontroller transmits binary command signals CMD10 and CMD11 on the three-status lines via optocouplers OPT3 and OPT4.

The radiomonitoring "Monitor" device preferably proceeds with jettisoning a container at the same time by actuating a second release device "Jettisoning Device N°2" via another set of optoocouplers OPT7 and OPT8 and verifies pre- and post-jettisoning status.

Preferably several pairs of jettisoning means typically four jettisoning devices with two pairs of beacons/containers are mounted on board the vessel in the event of successive losses of other crew members.

The device comprises means for triggering distress alert procedure in the event of the detected absence of signal reception from an individual portable transmitter or at each detected absence of signal reception from at least one individual portable transmitter.

This is because the monitoring device continues to monitor the presence on board of the other portable transmitters.

The third action consists of triggering a distress alert by forming or opening a dry contact on the terminals of the onboard distress alert radio broadcasting installation.

Figure 20:
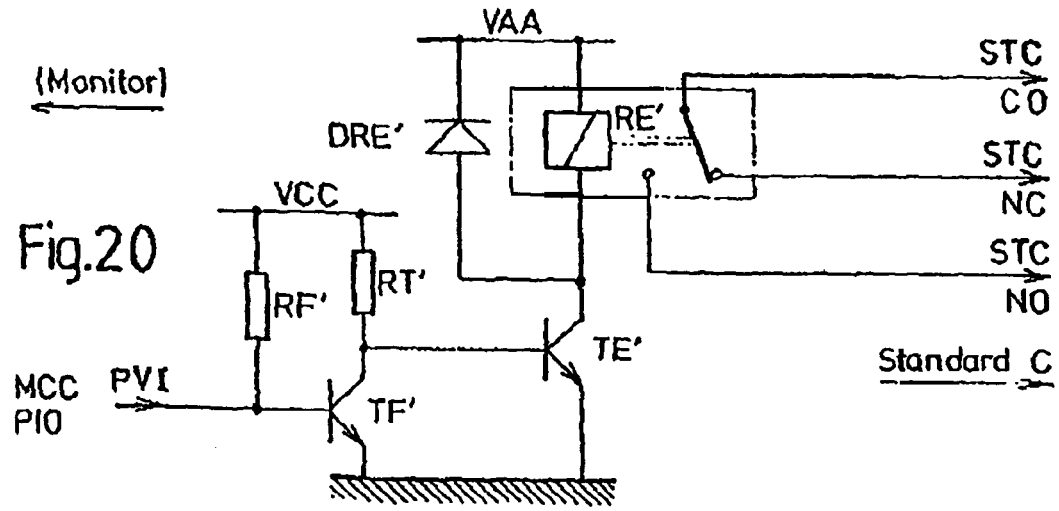
FIG. 20 shows details of the embodiment of means for triggering a distress alert via standard channel C of the INMARSAT system, commanded by an input/output port of the central unit of the radiomonitoring device in FIG. 6.
Figure 21:
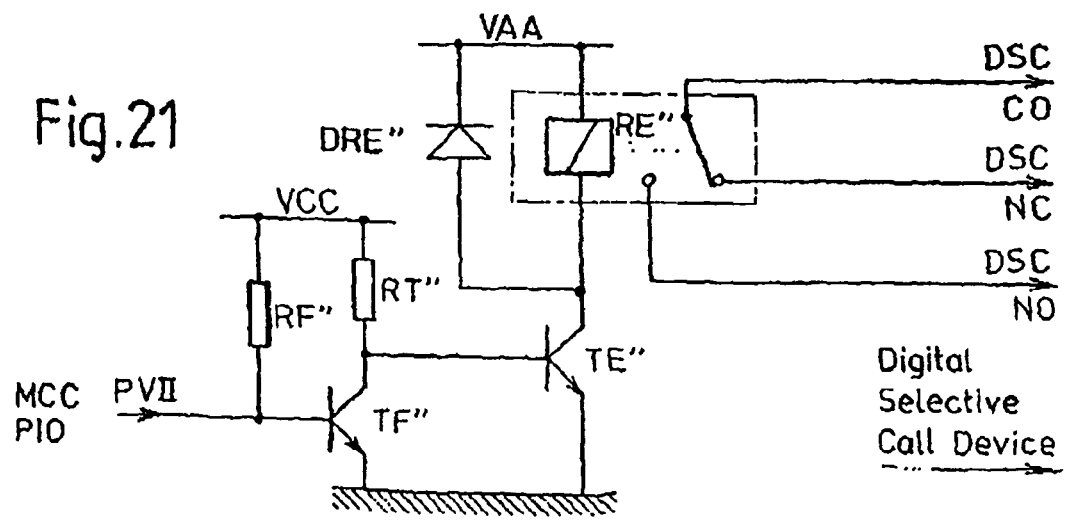
FIG. 21 shows embodiment details of the means for triggering a GMDSS distress alert via a Digital Selective Call device (DSC) commanded by an input/output port of the central unit of the radiomonitoring device in FIG. 6, FIG. 22 gives embodiment details for excitation and modulation means of the magnetic field produced by a coil arranged close to a magnetic compass, also commanded by input/output ports of the central unit of the radiomonitoring device in FIG. 6, FIG. 23 gives embodiment details for excitation and modulation means of the magnetic field produced by a coil arranged close to the magnetic compass also commanded by input/output ports of the central unit of the radiomonitoring device in FIG. 6, FIGS. 24, 25 and 26 show power supply stages by converters to the various electronic stages of the radiomonitoring device in FIG. 6, to the input/output interfaces in FIGS. 7 to 23, and to the charging device in FIG. 27.
Figure 22:
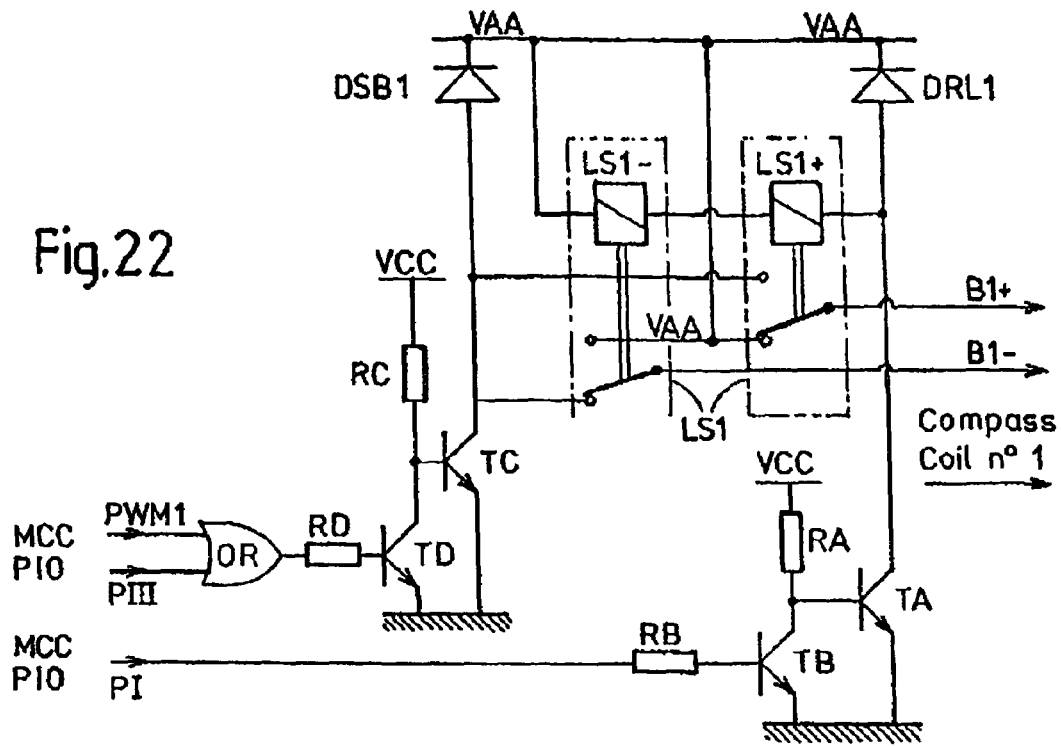
Figure 23:
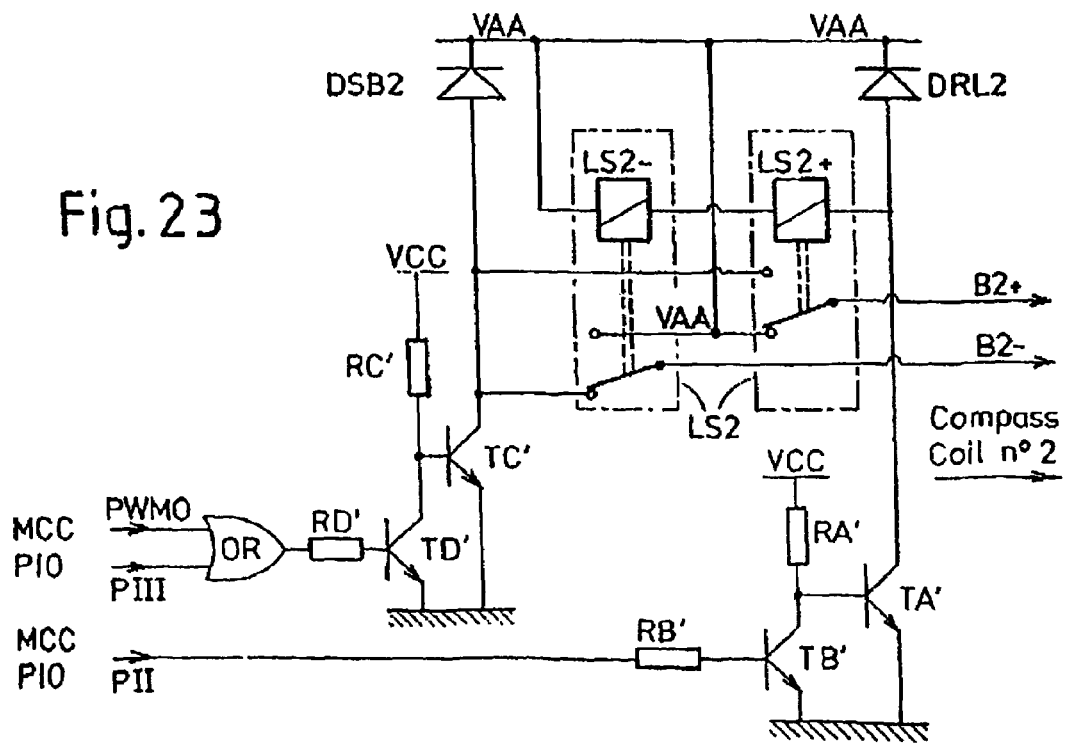
Figure 27:
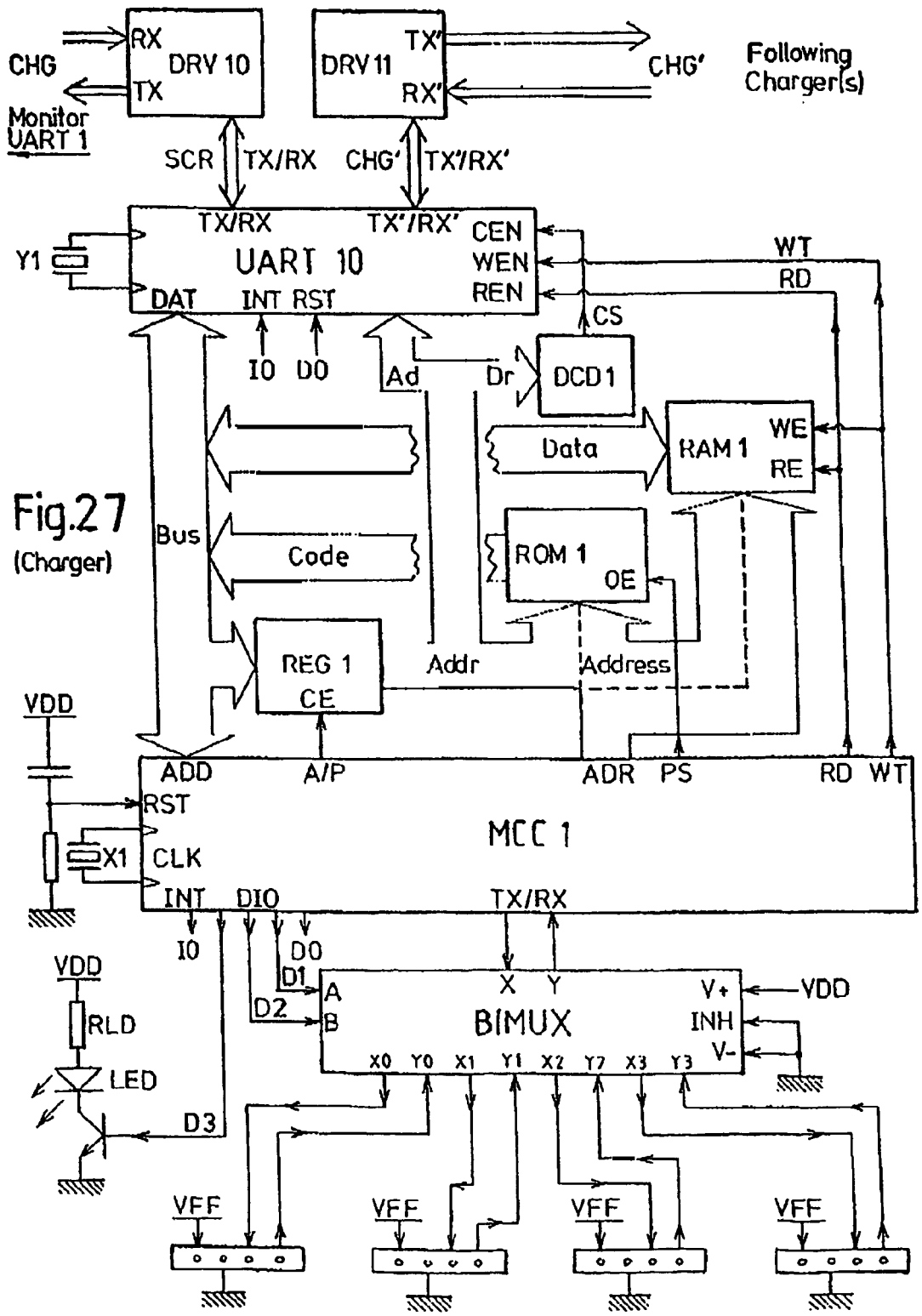
FIG. 27 is an overall functional electronic schematic of the central unit, of the interface and of the inputs/outputs of a modular device for charging the individual portable transmitters, FIG. 28 gives details of embodiment of the interface and of transmission pilots of the modular charging device in FIG. 27 with the radiomonitoring device in FIG. 6 and with another similar modular charging device.
Figure 28:
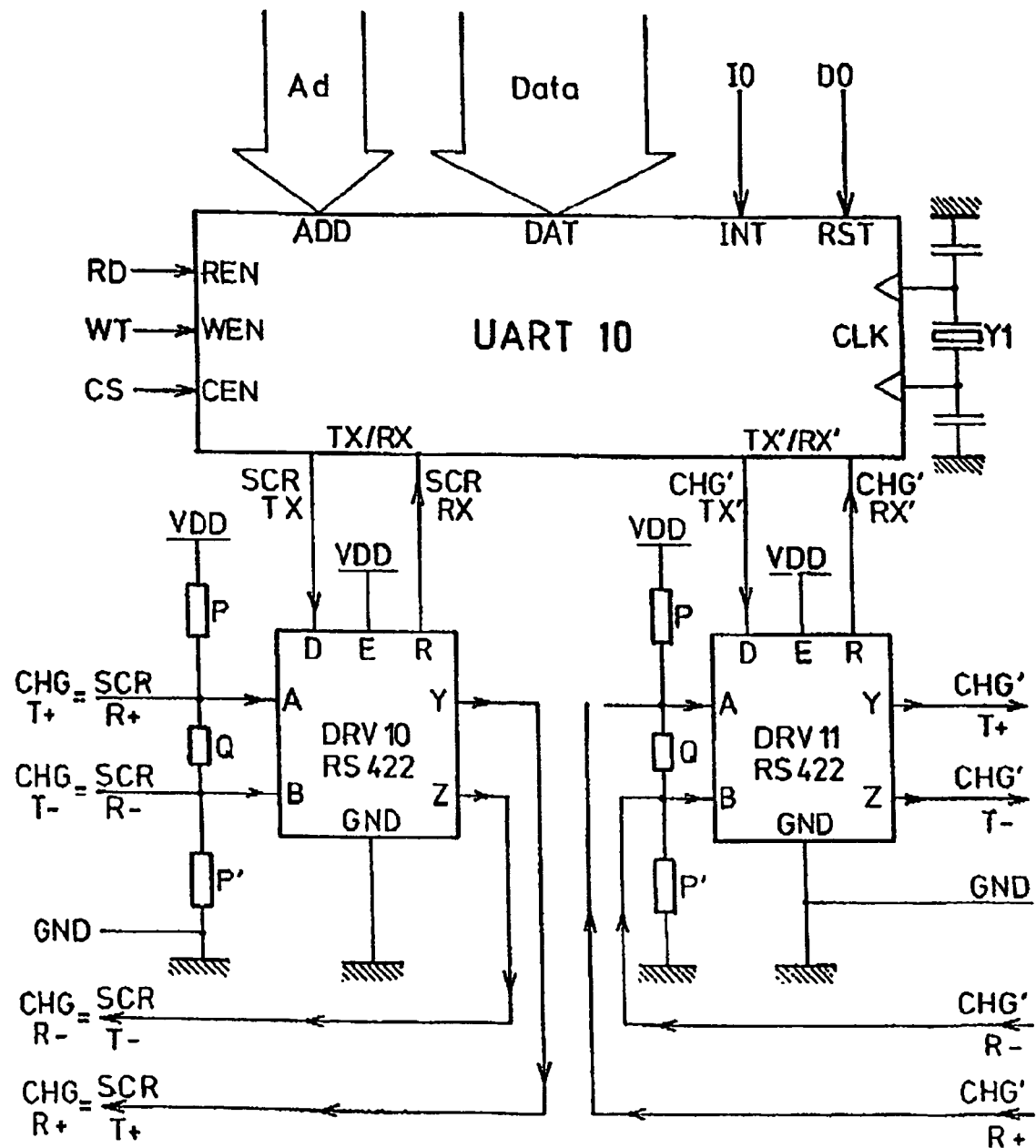
Figure 29:
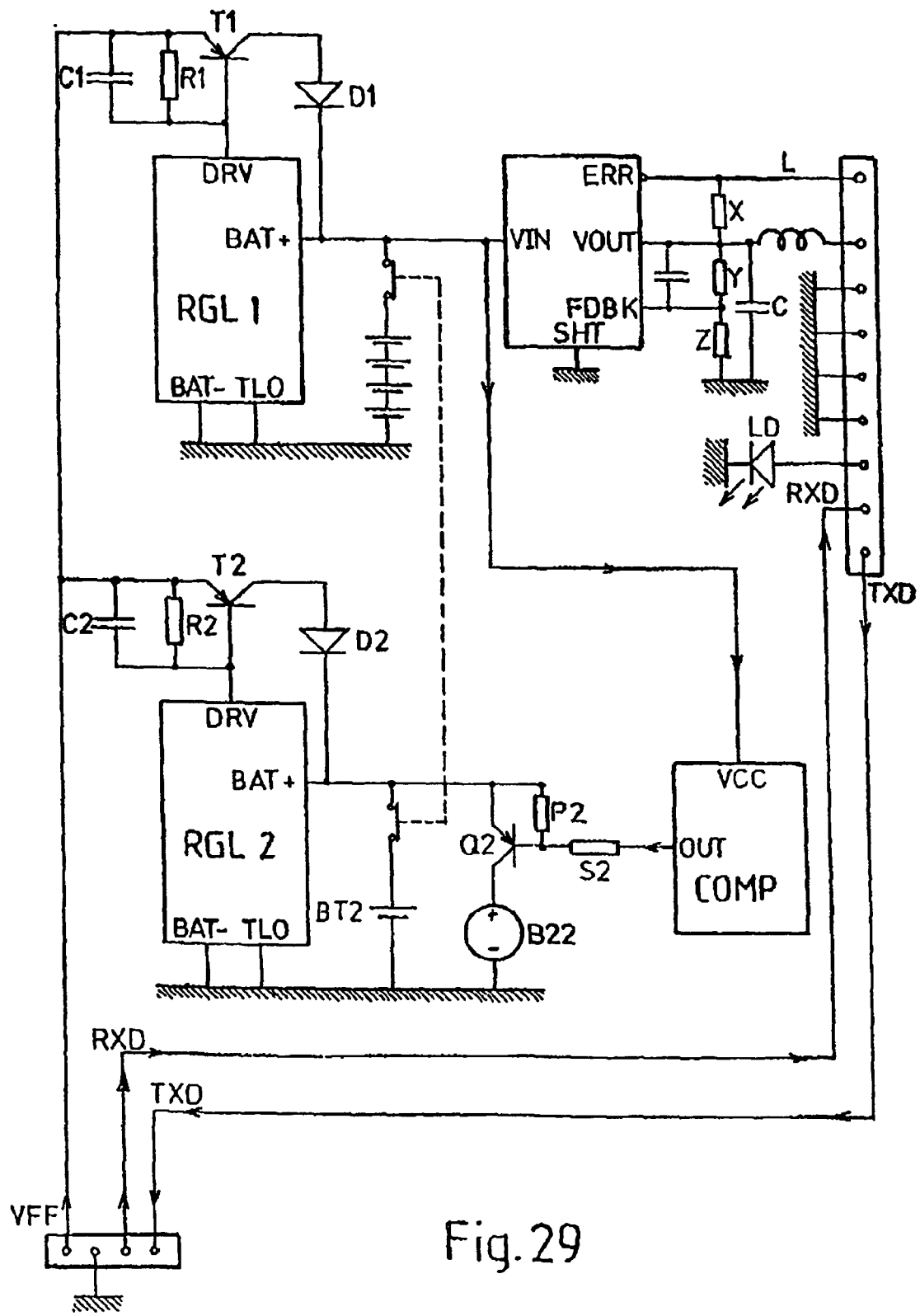
FIG. 29 is a functional, electronic schematic of an individual portable radio transmitter unit comprising means for regulating charge and power supply, a small modem radio receiver transmitter linked to the radiomonitoring device and a vibrator to warn of low battery power.

The command of these "Standard C" or "Digital Selective Calling" devices is made in fully identical manner as for triggering the alarm. The relay stages which actuate the Standard C and DSC commanded by the PVI and PVII commands of the DIO port of the MCC microcontroller are illustrated in FIGS. 20 and 21.

Figure 16:
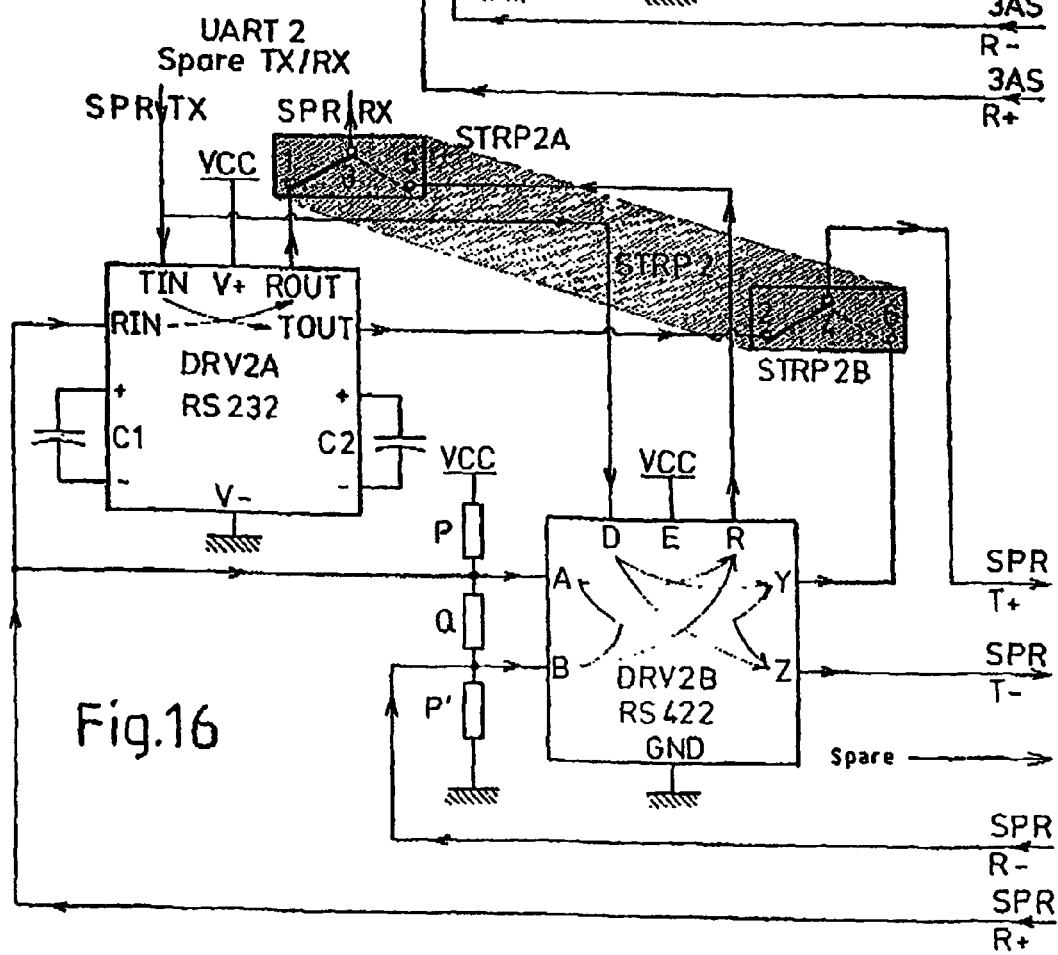
FIG. 16 shows details of transmission piloting via RS232 or RS422 serial link between the interface in FIG. 11 and the spare line, FIG. 17 gives details of embodiment of command and receiver lines of a small modem radio receiver transmitter to individual portable transceivers, FIG. 18 gives embodiment details of transmission piloting via RS232 serial link of the interface in FIG. 12 with the GPS positioning system and with electronic display of sea charting, FIG. 19 gives embodiment details of the means for triggering alarm controlled by an input/output port in the central unit of the radiomonitoring device in FIG. 6.

It is also to be noted that a free "Spare" line is provided on the CPU board of the monitoring device as illustrated in FIGS. 4 and 16, the line being pre-equipped with serial communication means RS232 or RS422 through simple modification of the STRP2 connections.

Similarly, a marine bus NMEA line is provided to transmit data via serial link to onboard equipment, in particular an onboard computer.

Finally, in the event of the detected absence of signal reception from an individual portable transmitter, the radiomonitoring device is able:

to continue permanently monitoring the reception and identification of radio signals regularly transmitted by each of the individual portable transmitters, to automatically detect any other absence of regular radio signal reception from at least one other individual portable transmitter, and in this case also to record automatically the other precise positioning data given by the onboard GPS positioning system as soon as the absence is detected of reception from another individual portable transmitter, and to reset in action, if necessary, the onboard alarm.

Means are therefore provided to record automatically the identification of each individual portable transmitter from which no signal reception is detected.

The device also comprises means for automatically recording the time and/or calculating the time lapsed since the time of the detected absence of signal from at least one individual portable transmitter.

The device comprises means for displaying the precise positioning data of the distress or of each distress incident, automatically recorded, so that another crew member may redirect the vessel and travel promptly to the precise overboard location.

The device also comprises means for displaying each recorded identification.

The device also comprises means for displaying the recorded time or calculated time lapse of each detected absence of radio signal from respective individual portable transmitters.

The device also comprises means for automatically triggering the jettisoning of at least one locator and survival radio beacon (BLS) in the event of the detected absence or at each detected absence of signal from respective individual portable transmitters.

The device also comprises means for automatically triggering at least one jettisoning of a life raft container joined to a respective beacon.

The device also comprises radio receiving and demodulation means to receive radio messages transmitted by a locator and survival radio beacon (BLS).

The device comprises means for extracting and recording precise beacon positioning data contained in the successive radio messages transmitted by the beacon.

The device comprises differential calculation means able to compare the precise positioning data given by the beacon with the accurate positioning data of the vessel given by the onboard GPS positioning system, to calculate with ultra-high accuracy the position of the beacon relative to the vessel.

The device comprises means for updating the display of positioning data by displaying the successively recorded precise positioning data of the beacon.

Advantageously the MOB positioning data and/or of the beacon or of each beacon are determined to an accuracy of within less than around ten meters, or in the order of one to ten meters.

The device comprises means for displaying positioning data in the form of geodesic coordinates.

The device comprises means for displaying positioning data in the form of precise bearing and distance indications.

Preferably, the precise positioning data are transmitted and displayed on a charting screen.

Preferably, positioning data are transmitted via serial link of RS232 or RS422 type in standard NMEA0183 format.

The device comprises means for transmitting positioning data to an onboard computer.

The device comprises calculation means able to determine the route to be followed (TRK) and/or the waypoints (WPT) as far as the site of the overboard (MOB) or as far as the position of the beacon (BLS).

The device comprises means for communicating the route to be followed (TRK) and/or the waypoints (WPT) to an automatic pilot device so that the vessel can automatically travel to the scene of the distress.

The device comprises means for automatically placing the vessel in stationary movement if the absence is detected of signal reception from at least one individual portable transmitter.

The device comprises means for activating and modulating a magnetic field produced by a system of magnetic coils arranged around a magnetic compass, that is part of an automatic pilot system, so as to divert the compass onto a fictitious North or South so that the automatic pilot causes the vessel to move over a stationary circular pathway.

The device comprises means for activating and modulating a magnetic field produced by coils arranged around a magnetic compass, that is part of an automatic pilot system, to divert the compass onto a fictitious North or South in relation to the direction of the wind so as to maintain the vessel in "headed into the wind" configuration with slack sails, in stationary position.

The device comprises means for cutting out the engine or engines of the vessel.

Advantageously, the device comprises means for automatically setting in action Distress Alert procedure, comprising the activation of at least one radioelectric station installation on board the vessel, the triggering of at least one distress alert broadcast under the radiocommunications service that is part of the Global Maritime Distress and Safety System (GMDSS) as defined by the International Maritime Organisation (IMO).

The device comprises means for triggering the broadcasting of a distress alert via Digital Selective Calling (DSC) within the Global Maritime Distress and Safety System (GMDSS) as defined by the International Maritime Organization (IMO).

Advantageously, the distress alert broadcast via Digital Selective Calling comprises positioning data automatically recorded at the time the distress procedure was set in action in addition to the time of the call, the area code of the call, the identity of the vessel station and optionally other codes.

Alternatively, the device comprises means for triggering the distress alert broadcast via a satellite of the INternational MARitime SATellite organisation INMARSAT.

Preferably, the distress alert broadcast is made by setting in action a terrestrial station of the vessel that is part of the INMARSAT satellite network, the broadcast corresponding in particular to standard channel C and/or the capacities of Enhanced Group Calling of the International SafetyNet Service, in particular on the radiocommunications 1.6 GHz band.

Finally, provision is made for distress alert procedure to be set in action also by an alarm signal sent by a device for automatically detecting damage to the vessel, in particular for detecting a rise in water level inside the vessel, for detecting fire on board and/or for detecting excessive lean of the vessel by means of sensors.

The device also comprises means for transmitting polling radiofrequency signals to each individual portable transmitter.

Provision is made for the device to comprise means for storing identification data, in particular an identification number corresponding to each individual transmitter.

The device comprises means for recognizing the identification data transmitted by each individual transmitter in reply to each identification radio-frequency signal.

Advantageously, the transmissions of identification radiofrequency signals between the device and each individual portable transmitter use a securitized transmission protocol.

Provision is also made for the device to comprise means for allocating own identification data, in particular an identification number to each individual portable transmitter.

Advantageously, the identification data particular to each transmitter are transmitted via serial link through a charging device for the individual portable transmitters.

Finally provision is made for the device to stop scanning regular reception of identification radio signals transmitted by an individual portable transmitter when said individual portable transmitter is placed on a charging device.

The invention claimed is:

1. A method for safety on board a vessel with which to detect a distress of one or more overboard persons, to give an immediate alert and to locate the distress precisely, so as to send prompt rescue and allow rapid recovery of the overboard person or persons, the method implementing the steps of:
   a) equipping each crew member or at least part of the crew with a respective individual portable radio transmitter unit, each transmitter unit regularly transmitting an identification radio signal;
   b) permanently scanning, by means of a radio monitoring device, reception and identification of the radio signals regularly transmitted by each individual portable transmitter; and
   c) automatically detecting a non-reception of a regular radio signal transmission from at least one individual portable transmitter, and upon detecting the non-reception of the regular radio signal,
   i) automatically recording precise positioning data given on board the vessel by a satellite Global Positioning System (GPS), the precise positioning data being recorded as soon as the non-reception of the regular signal transmission by at least one individual portable transmitter is detected,
   ii) automatically jettisoning at least one locator and survival radio beacon (BLS), as soon as the non-reception of the regular signal transmission from an individual portable transmitter is detected, the beacon comprising a floating body, a satellite Global Positioning system (GPS) equipment, and a radiotransmitting device transmitting radio messages containing precise positioning data given by GPS calculation equipment, and
   iii) displaying the automatically recorded precise positioning data so that another crew member on board can redirect the vessel to travel promptly to the exact overboard location.

2. The method as in claim 1, comprising the further step of jettisoning a floating rescue container connected to the locator and survival radio beacon, the floating container containing a life raft, a survival kit, and one of a VHF transmitter-receiver and a satellite telephone.

3. The method of claim 1, wherein,
   the beacon is equipped with a radar transponder, and
   comprising the further step of remotely locating and identifying the position of the beacon by means of a radar screening device.

4. The method of claim 1, comprising the further steps of:
   receiving, by means of a radio-receiver, the radio messages transmitted by the beacon device (BLS), and
   successively recording the precise positioning data contained in the received radio messages.

5. The method of claim 4, comprising the further step of:
   comparing the precise positioning data given by the onboard GPS system with the precise positioning data of the beacon given by the GPS unit on board the beacon, to determine ultra-accurately and by differential calculation the position of the beacon in relation to the vessel.

6. The method of claim 1, comprising the further steps of:
re-updating a display of overboard positioning data by displaying the successively recorded precise positioning data of the beacon.

7. The method of claim 6, wherein,
the display of precise overboard location or beacon positioning data is made in the form of geodesic coordinates.

8. The method of claim 6, wherein,
the display of precise positioning data is made in the form of bearing and distance indications.

9. The method of claim 5, wherein,
the overboard location or successive beacon positioning data are transmitted and displayed on a charting screen of an onboard computer, and
by means of the onboard computer, a route to be followed or waypoints are determined as far as the overboard location or as far as the position of the beacon.

10. The method of 9, wherein,
the route to be followed or the waypoints are communicated to an automatic pilot so that the vessel automatically travels to the scene of the distress.

11. The method of claim 1, comprising the further step of i) detecting an absence of signal reception from an individual portable transmitter, and ii) automatically setting in action Distress Alert procedure, comprising activation of at least one radioelectric station installation on board the vessel, and triggering of at least one distress alert broadcast under a radio communications service forming part of the Global Maritime Distress and Safety System (GMDSS) as defined by the International Maritime Organisation (IMO).

12. The method of claim 11, wherein,
the distress alert procedure is directed to a space radio-communications service and includes a step of triggering a broadcasting of a distress alert via a satellite in the INMARSAT satellite network of the INternational MAritime SATellite organization.

13. A radiomonitoring device for scanning for a presence of at least one individual portable radio transmitter unit, to form a ship safety system and make possible detection a loss overboard of one or more crew members, to give an immediate alert and to locate the overboard with accuracy, so as to send rescue promptly and enable rapid recovery of the overboard person or persons, the device comprising:
means for receiving identification radio signals regularly transmitted by each of plural individual portable transmitter units;
means for permanently scanning the regular reception and identification of radio signals transmitted by each individual portable transmitter unit;
means for automatically detecting any absence of radio signal reception from at least one individual portable transmitter unit;
means for automatically recording accurate man overboard positioning data (MOB) given by a satellite network global positioning equipment (GPS), the precise man overboard positioning data (MOB) being recorded substantially as soon as the absence is detected of regular radio transmission by at least one individual portable transmitter; and
means for automatically triggering at least one jettisoning of a locator and survival beacon (BLS) in the event of the detected absence or at each detected absence of reception from an individual portable transmitter.

14. The device of claim 13, further comprising means for automatically triggering at least one jettisoning of a rescue container joined to a respective beacon.

15. The device of claim 14, wherein, the rescue container is joined to the beacon by a rope.

16. The device of claim 14, wherein, the rescue container is joined to the beacon by a rope of more than 20 meters.

17. The device of claim 13, further comprising a radio receiving and demodulation means to receive radio messages transmitted by a locator and survival radio beacon (BLS) and means for extracting and recording precise beacon positioning data contained in the radio messages transmitted by the beacon (BLS).

18. The device of claim 17, further comprising:
differential calculation means able to compare the precise positioning data of the beacon with the precise positioning data of the vessel given by the on-board Global Positioning System (GPS) computation equipment to determine ultra-precisely the position of the beacon in relation to the vessel.

19. The device of claim 18, further comprising means for updating a display of overboard location data, by displaying the successively recorded precise positioning data of the beacon.

20. The device of claim 19, further comprising means for displaying positioning data in geodesic coordinate form.

21. The device of claim 20, further comprising means for displaying the positioning data in precise bearing and distance indications form.

22. The device of claim 21, further comprising a charting screen for disclosing the transmitted precise positioning data.

23. The device of claim 22, further comprising:
means for transmitting the positioning data to an onboard computer; and
computing means to determine a route to be followed (TRK) or waypoints (WPT) as far as an overboard location (MOB) or as far as the beacon position (BLS).

24. The device of claim 23, further comprising:
means for automatically setting in action a Distress Alert procedure comprising activation of at least one radioelectric station installation on board the vessel, and triggering of at least one distress alert broadcast under the radiocommunications service of the Global Maritime Distress and Safety System (GMDSS) as defined by the International Maritime Organisation (IMO).

25. The device of claim 24, further comprising:
means for triggering the broadcasting of a distress alert via a satellite of the INMARSAT network of the INternational MARitime SATellite Organisation.

26. The device of claim 25, further comprising:
means for allocating an own identification data in a form of an identification number to each portable transmitter by transmission via a serial link through a charging device for the individual portable transmitters.

27. The device of claim 14, wherein,
the device ceases to scan the regular reception of identification radio signals transmitted by an individual portable transmitter when said individual portable transmitter is placed on a charging device.

28. An onboard safety system for a vessel with which to detect a loss overboard of one or more crew members, to give an immediate alert and to accurately locate the overboard location, so as to send rescue promptly enabling rapid recovery of the overboard person or persons, comprising:

at least one individual portable transmitter unit containing means for regularly transmitting an identification radio frequency signal associated with the radiomonitoring device of claim 13, at least one radio transmitting locator and survival beacon configured to transmit radio signals to a device containing i) a floating body, ii) a position computing equipment using the satellite Global Positioning System (GPS), and iii) a radio transmitting device for transmitting radio messages containing precise positioning data given by the Global Positioning System (GPS) computing equipment, and at least one device for the automatic jettisoning of a beacon, configured to be commanded by the radiomonitoring device to automatically jettison at least one locator and survival beacon (BLS) in an event of detected absence of signal reception for an individual portable transmitter.

* * * * *